(12) United States Patent
Gholmieh et al.

(10) Patent No.: US 10,819,524 B2
(45) Date of Patent: Oct. 27, 2020

(54) METHODS FOR HEADER EXTENSION PRESERVATION, SECURITY, AUTHENTICATION, AND PROTOCOL TRANSLATION FOR RTP OVER MPRTP

(71) Applicant: QUALCOMM Incorporated, San Diego, CA (US)

(72) Inventors: Ralph Akram Gholmieh, San Diego, CA (US); Sivaramakrishna Veerepalli, San Diego, CA (US); Min Wang, San Diego, CA (US); Long Duan, San Diego, CA (US); Mukesh Kumar Mittal, San Diego, CA (US); Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 15/689,742

(22) Filed: Aug. 29, 2017

(65) Prior Publication Data

US 2018/0109388 A1    Apr. 19, 2018

Related U.S. Application Data

(60) Provisional application No. 62/410,110, filed on Oct. 19, 2016.

(51) Int. Cl.
*H04L 9/32* (2006.01)
*H04L 29/06* (2006.01)
(Continued)

(52) U.S. Cl.
CPC .............. *H04L 9/3247* (2013.01); *H04L 9/14* (2013.01); *H04L 12/40182* (2013.01);
(Continued)

(58) Field of Classification Search
None
See application file for complete search history.

(56) References Cited

U.S. PATENT DOCUMENTS

| | | | |
|---|---|---|---|
| 6,978,367 B1 * | 12/2005 | Hind | G06F 21/577 380/273 |
| 7,389,529 B1 * | 6/2008 | Enderwick | H04L 63/164 713/150 |

(Continued)

OTHER PUBLICATIONS

Singh et al.; Multipath RTP (MPRTP) draft-singh-avtcore-mprtp-10; 2014; Retrieved from the Internet: URL: https://tools.ietf.org/html/draft-singh-avtcore-mprtp-10; pp. 1-40, as printed. (Year: 2014).*

(Continued)

*Primary Examiner* — Saleh Najjar
*Assistant Examiner* — Michael W Chao
(74) *Attorney, Agent, or Firm* — The Marbury Law Group, PLLC

(57) ABSTRACT

Systems, methods, and devices of the various embodiments provide for header extension preservation, security, authentication, and/or protocol translation for Multipath Real-Time Transport Protocol (MPRTP). Various embodiments include methods that may be implemented in a processor of a computing device for MPRTP transmission of Real-Time Transport Protocol (RTP) packets. Various embodiments may include receiving an RTP packet in which the received RTP packet may be part of an RTP stream that may be protected using secure RTP (SRTP), and applying an authentication signature to the RTP packet to authenticate an MPRTP header extension separate from a body of the RTP packet. Various embodiments may include sending and/or receiving MPRTP subflows of an MPRTP session in which a same security context may be applied across all MPRTP subflows of the MPRTP session.

12 Claims, 18 Drawing Sheets

(51) Int. Cl.
*H04L 12/40* (2006.01)
*H04L 12/46* (2006.01)
*H04L 29/12* (2006.01)
*H04L 12/707* (2013.01)
*H04L 9/14* (2006.01)

(52) U.S. Cl.
CPC ......... *H04L 12/4641* (2013.01); *H04L 45/24* (2013.01); *H04L 61/2589* (2013.01); *H04L 63/0428* (2013.01); *H04L 63/08* (2013.01); *H04L 63/126* (2013.01); *H04L 65/608* (2013.01); *H04L 69/22* (2013.01); *H04L 63/166* (2013.01)

(56) References Cited

U.S. PATENT DOCUMENTS

| | | | | |
|---|---|---|---|---|
| 7,948,986 | B1* | 5/2011 | Ghosh | H04L 45/50 370/392 |
| 8,966,105 | B2 | 2/2015 | Blom et al. | |
| 9,065,741 | B1* | 6/2015 | Varanasi | H04L 47/12 |
| 9,491,098 | B1* | 11/2016 | Wilson | H04L 47/125 |
| 10,356,054 | B2* | 7/2019 | Dolev | H04L 9/0656 |
| 2002/0089992 | A1* | 7/2002 | Yip | H04L 12/4645 370/401 |
| 2004/0047308 | A1* | 3/2004 | Kavanagh | H04W 12/1006 370/328 |
| 2004/0158606 | A1* | 8/2004 | Tsai | H04L 61/2567 709/203 |
| 2005/0182932 | A1* | 8/2005 | Wheeler | H04L 9/12 713/168 |
| 2008/0134332 | A1* | 6/2008 | Keohane | H04L 63/0254 726/23 |
| 2008/0198863 | A1* | 8/2008 | Volpano | H04L 12/4641 370/401 |
| 2008/0301745 | A1* | 12/2008 | Liu | H04N 21/4384 725/110 |
| 2009/0013362 | A1* | 1/2009 | Liu | H04N 21/4384 725/110 |
| 2010/0040206 | A1* | 2/2010 | DelRegno | H04M 7/006 379/32.01 |
| 2011/0093609 | A1* | 4/2011 | Blom | H04L 63/0428 709/231 |
| 2011/0113236 | A1* | 5/2011 | Chenard | H04L 63/0485 713/154 |
| 2011/0246781 | A1* | 10/2011 | Morita | G06F 21/54 713/180 |
| 2011/0264905 | A1* | 10/2011 | Ovsiannikov | H04L 63/168 713/151 |
| 2012/0066500 | A1* | 3/2012 | Ananthasubramanian | H04L 63/061 713/171 |
| 2013/0138822 | A1* | 5/2013 | Hu | H04L 65/1069 709/227 |
| 2014/0298415 | A1* | 10/2014 | Xie | H04L 61/2589 726/3 |
| 2015/0026756 | A1* | 1/2015 | Reddy | H04W 12/08 726/1 |
| 2015/0127701 | A1* | 5/2015 | Chu | H04L 45/22 709/201 |
| 2015/0201046 | A1* | 7/2015 | Biswas | H04L 69/321 370/329 |
| 2015/0215225 | A1* | 7/2015 | Mildh | H04L 47/41 370/236 |
| 2016/0036862 | A1* | 2/2016 | Bagepalli | H04L 63/166 726/1 |
| 2016/0119196 | A1* | 4/2016 | Comeras | H04L 41/5054 709/226 |
| 2017/0093713 | A1* | 3/2017 | Garcia-Luna-Aceves | H04L 45/50 |
| 2017/0214720 | A1* | 7/2017 | Inamdar | H04L 65/1066 |
| 2017/0222917 | A1* | 8/2017 | Reddy | H04L 45/24 |
| 2017/0317920 | A1* | 11/2017 | Rocquelay | H04L 45/24 |
| 2018/0317156 | A1* | 11/2018 | Bergstrom | H04W 40/34 |
| 2019/0281099 | A1* | 9/2019 | Lakos | H04L 43/12 |
| 2020/0128112 | A1* | 4/2020 | Li | H04L 47/10 |
| 2020/0145324 | A1* | 5/2020 | Wei | H04L 5/0055 |

OTHER PUBLICATIONS

Dierks et al.; The Transport Layer Security (TLS) Protocol Version 1.2; 2008; retrieved from the Internet: URL: https://tools.ietf.org/html/rfc5246; pp. 1-104, as printed. (Year: 2008).*

Baugher et al.; The Secure Real-time Transport Protocol (SRTP); 2004; retrieved from the Internet https://tools.ietf.org/html/rfc3711; pp. 1-56, as printed. (Year: 2004).*

International Search Report and Written Opinion—PCT/US2017/049379—ISA/EPO—dated Nov. 3, 2017.

Singh V., et al., "Multipath RTP (MPRTP); draft-ietf-avtcore-mprtp-03.txt", Internet Engineering Task Force, IETF; Standard Working Draft, Internet Society (ISOC), 4, Rue Des Falaises CH-1205 Geneva, Switzerland, Jul. 8, 2016, pp. 1-41, XP015114184, [retrieved on Jul. 8, 2016].

Westerlund M., et al., "Options for Securing RTP Sessions; rfc7201. lxt", Internet Engineering Task Force, IETF; Standard Working Draft, Internet Society (ISOC), 4, Rue Des Falaises CH-1205 Geneva, Switzerland, Apr. 15, 2014, pp. 1-37, XP015100625, [retrieved on Apr. 15, 2014].

Singh V., et al., "Multipath RTP (MPRTP); draft-ietf-avtcore-mprtp-10", AVT Core Working Group, Internet-Draft, Nov. 14, 2014, pp. 1-40.

* cited by examiner

1000

SDP offer v=0 o=MCTM<sess-id><sess-version>IN Ipv<IP address for signaling> s=GM MBB

...

c=IN IPv IP_address_source_1      ← 1002 t=0 0

...

a=sendonly b=AS:0 b=RS:XXX1 b=RR:XXX2 m=video p_source_11 RTP/AVP n1   ← 1004 b=AS:0 b=RS:XXX b=RR:XXX a=rtpmap:n1 H264/90000 a=fmtp:n1 profile-level-id=XXXXXX;...

m=video p_source_12 RTP/AVP n2   ← 1006 b=AS:0 b=RS:XXX b=RR:XXX a=rtpmap:n2 H264/90000 a=fmtp:n2 profile-level-id=XXXXXX;...

| SDP_mprtp offer |
|---|
| v=0 |
| o=translator\<sess-id\>\<sess-version\>IN Ipv\<IP address for signaling\> |
| s=GM MBB |
| ... |
| c=IN IPv IP_address_translator_1  ← 1001 |
| t=0 0 |
| ... |
| a=sendonly |
| b=AS:0 |
| b=RS:XXX1 |
| b=RR:XXX2 |
| |
| m=video p_translator_11 RTP/AVP n1  ← 1003 |
| b=AS:0 |
| b=RS:XXX |
| b=RR:XXX |
| a=rtpmap:n1 H264/90000 |
| a=fmtp:n1 profile-level-id=XXXXXX;... |
| a=extmap:m urn:ietf:params:rtp-hdrext:mprtp  ← 1010 |
| a=mprtp interface:1 IP_address_translator_1:p_translator_11 ;primary interface |
| a=mprtp interface:2 IP_address_translator_2:p_translator_21 ;additional interface |
| a=mprtp interface:3 IP_address_translator_3:p_translator_31 ;additional interface |
| |
| m=video p_translator_12 RTP/AVP n2  ← 1005 |
| b=AS:0 |
| b=RS:XXX |
| b=RR:XXX |
| a=rtpmap:n2 H264/90000 |
| a=fmtp:n2 profile-level-id=XXXXXX;... |
| a=extmap:m urn:ietf:params:rtp-hdrext:mprtp  ← 1012 |
| a=mprtp interface:1 IP_address_translator_1:p_translator_12 ;primary interface |
| a=mprtp interface:2 IP_address_translator_2:p_translator_22 ;additional interface |
| a=mprtp interface:3 IP_address_translator_3:p_translator_32 ;additional interface |

FIG. 10B

METHODS FOR HEADER EXTENSION PRESERVATION, SECURITY, AUTHENTICATION, AND PROTOCOL TRANSLATION FOR RTP OVER MPRTP

RELATED APPLICATIONS

This application claims the benefit of priority to U.S. Provisional Patent Application No. 62/410,110 entitled "Methods for Header Extension Preservation, Security, Authentication, and Protocol Translation for RTP over MPRTP" filed Oct. 19, 2016, the entire contents of which are hereby incorporated by reference.

BACKGROUND

The current Multipath Real-Time Transport Protocol (MPRTP), as described in the Internet Engineering Task Force (IETF) Audio/Video Transport (AVT) Core Working Group's Internet-Draft draft-ietf-actcore-mprtp-03 available at https://tools.ietforg/html/draft-ietf-avtcore-mprtp-03, extends the single delivery pathway Real-time Transport Protocol (RTP) and RTP Control Protocol (RTCP) to enable RTP and RTCP to deliver data and control packets along multiple delivery pathways. For example, the current MPRTP can be used to deliver data and control packets along multiple different delivery pathways established at least in part using different Long Term Evolution (LTE) connections to one or more cellular network. While the current MPRTP can enable a single transport session to take advantage of multiple delivery pathways between two computing devices, there are problems with multiple delivery pathway transport sessions that the current MPRTP does not address.

SUMMARY

The systems, methods, and devices of the various embodiments provide for header extension preservation, security, authentication, and/or protocol translation for Multipath Real-Time Transport Protocol (MPRTP). In various embodiments, header extension preservation may be provided for MPRTP such that Real-Time Transport Protocol (RTP) headers that do not follow RFC 5285 may be used with RTP streams delivered using MPRTP. In various embodiments, authentication for MPRTP may be provided by applying the same encryption and authentication keys to all MPRTP subflow packets. Various embodiments may provide a RTP (or secure RTP (SRTP)) to MPRTP translator for a RTP (or SRTP) streams. In various embodiments, an MPRTP translator may use header extension preservation to preserve SRTP encryption and authentication. In various embodiments, an MPRTP translator may add additional authentication signatures that apply secure MPRTP to the entire MPRTP packet.

Various embodiments include methods that may be implemented in a processor of a computing device for MPRTP transmission of RTP packets. Various embodiments may include receiving an RTP packet that may be part of an RTP stream that may be protected using SRTP, and applying an authentication signature to the RTP packet to authenticate an MPRTP header extension separate from a body of the RTP packet. In some embodiments, the authentication signature may be a Secure MPRTP (SMPRTP) tag. In some embodiments, the computing device may be a server. Some embodiments may further include receiving an MPRTP packet in which the received MPRTP packet may be authenticated using another SMPRTP tag, recovering media content included in the MPRTP packet, generating a new MPRTP packet including the media content for transmission on a new set of paths, and applying a new authentication signature to the new MPRTP packet to authenticate an MPRTP header extension separate from a body of the new MPRTP packet.

Various embodiments include methods that may be implemented in a processor of a computing device for MPRTP transmission of RTP packets. Various embodiments may include receiving an RTP packet, determining whether an RTP header extension of the RTP packet is allowed, and appending an MPRTP header extension to the RTP packet including an indication that the rest of the extension header should not be processed in response to determining that the RTP header extension of the RTP packet is not allowed.

Various embodiments include methods that may be implemented in a processor of a computing device for MPRTP transmission of RTP packets. Various embodiments may include receiving an RTP packet with an MPRTP header extension, dropping the MPRTP header extension parts added by a MPRTP source to reconstitute an original SRTP packet from the received RTP packet, and passing the reconstituted original SRTP packet to an SRTP decoder. In some embodiments, the received RTP packet may include an authentication signature to authenticate the MPRTP header extension separate from a body of the received RTP packet.

Various embodiments include methods that may be implemented in a processor of a computing device for MPRTP transmission of RTP packets. Various embodiments may include sending MPRTP subflows of an MPRTP session in which a same security context is applied across all MPRTP subflows of the MPRTP session. In some embodiments, the same security context may be a same SRTP encryption and authentication. In some embodiments, the same security context may be established over a first MPRTP stream with a destination computing device and applied to the remaining MPRTP subflows.

Various embodiments include methods that may be implemented in a processor of a computing device for MPRTP transmission of RTP packets. Various embodiments may include receiving MPRTP subflows of an MPRTP session in which a same security context may be applied across all MPRTP subflows of the MPRTP session. In some embodiments, the same security context may be a same SRTP encryption and authentication.

Various embodiments may include a computing device having a processor configured with processor-executable instructions to perform operations of any of the methods summarized above. Various embodiments may include a computing device having means for performing functions of any of the methods summarized above. Various embodiments may include non-transitory processor-readable media on which are stored processor-executable instructions configured to cause a processor of a computing device to perform operations of any of the methods summarized above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 10A is an example schema of a RTP session description protocol (SDP) according to an embodiment.

FIG. 10B is an example schema of the RTP SDP of FIG. 10A modified to include MPRTP extension information.

DETAILED DESCRIPTION

Figure 1:
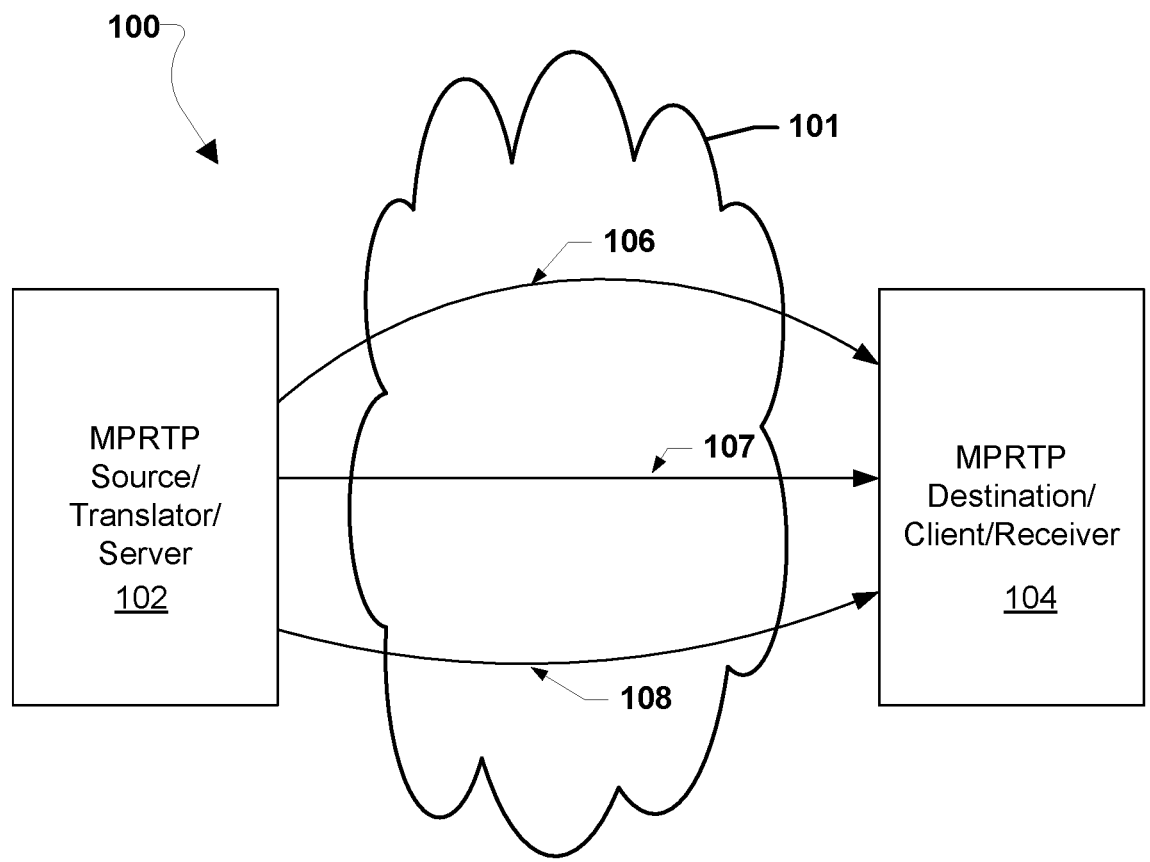
FIG. 1 is a communication system block diagram of a network suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device", "receiver device", and "computing device" are used interchangeably herein to refer to any one or all of cellular telephones, smart phones, personal or mobile multi-media players, personal data assistants (PDAs), laptop computers, personal computers, tablet computers, smart books, palm-top computers, wireless electronic mail receivers, multimedia Internet enabled cellular telephones, wireless gaming controllers, satellite or cable set top boxes, streaming media players (such as, ROKU™ or CHROMECAST™ or FIRE TV™), smart televisions, digital video recorders (DVRs), and similar personal electronic devices which include a programmable processor and memory and circuitry for sending and/or receiving files.

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

The current Multipath Real-Time Transport Protocol (MPRTP), as described in the Internet Engineering Task Force (IETF) Audio/Video Transport (AVT) Core Working Group's Internet-Draft draft-ietf-actcore-mprtp-03 available at https://tools.ietforg/html/draft-ietf-avtcore-mprtp-03, extends the single delivery pathway Real-time Transport Protocol (RTP) and RTP Control Protocol (RTCP) to enable RTP and RTCP to deliver data and control packets along multiple delivery pathways. However, there are problems with multiple delivery pathway transport sessions that the current MPRTP may not address.

As an example of a problem, the current MPRTP is only compatible with header extensions as defined in IETF Network Working Group Request For Comments (RFC) 5285 "A General Mechanism for RTP Header Extensions" available at https://tools.ietf.org/html/rfc5285. Thus, header extensions that do not conform to RFC 5285 are not usable in current MPRTP.

As another example, the current MPRTP does not provide a mechanism to apply encryption and authentication keys to MPRTP subflow packets when authentication is applied to MPRTP header extensions. As another example, the current MPRTP does not provide a RTP to MPRTP translator for a RTP or Secure-Real Time Transport Protocol (SRTP) streams. In another example, the current MPRTP does not provide a mechanism to preserve SRTP authentication across MPRTP subflows when an MPRTP stack (or layer or client) does not have the original authentication/encryption keys for a SRTP stream.

The systems, methods, and devices of the various embodiments provide for header extension preservation, security, authentication, and/or protocol translation for MPRTP.

In various embodiments, header extension preservation may be provided for MPRTP such that RTP headers that do not follow RFC 5285 may be used with RTP streams delivered using MPRTP. In an embodiment, a computing device sending a RTP stream over MPRTP may determine whether the RTP header extension for a packet of the RTP stream complies with RFC 5285. In response to determining that the RTP header extension for the packet of the RTP stream to be delivered by MPRTP does not follow RFC 5285, the computing device sending the RTP stream may add an MPRTP header extension to the packet that indicates to the receiving computing device (also referred to as a destination computing device) that the rest of the header should not be processed. For example, the computing device sending the RTP stream may add ID 15 (or type 15) after the MPRTP header extension to indicate that the rest of the header should not be processed. The computing device sending the RTP stream may send the packet with the MPRTP header extension via MPRTP.

A computing device receiving the packet with the MPRTP header extension via MPRTP may determine from the MPRTP header extension that the rest of the header should not be processed. For example, the receiving computing device may determine that the MPRTP header extension includes ID 15 (or type 15) after the MPRTP header extension, which indicates that the rest of the header should not be processed. In response to determining that the rest of the header should not be processed, the computing device receiving the packet may strip the added MPRTP specific extension header as well as the extension header type 15 from the packet. By stripping the extension headers that were added by MPRTP, the original RTP extension of the packet may be restored before the packet is passed from the MPRTP layer (or stack or client) of the computing device receiving the packet to the RTP layer (or stack or client) of the computing device receiving the packet and RTP headers that do not follow RFC 5285 may be used with RTP streams delivered using MPRTP. In various embodiments, MPRTP header extension preservation may also be applied to SRTP packets to preserve SRTP encryption and authentication.

In various embodiments, authentication for MPRTP may be provided by applying the same encryption and authentication keys to all MPRTP subflow packets. In various embodiments, a computing device sending MPRTP packets and a computing device receiving MPRTP packets may negotiate encryption and authentication on a default path, such as one of the MPRTP interfaces between the two devices. The encryption and authentication negotiated on the default path may be applied to the remaining MPRTP subflows. In this manner, the security context may be reused by all MPRTP subflows when authentication is applied to the MPRTP header extensions.

Various embodiments may provide a RTP (or SRTP) to MPRTP translator for a RTP (or SRTP) streams. In various embodiments, a computing device configured to operate as an MPRTP translator (i.e., an MPRTP translator) may receive an RTP (or SRTP) stream from a source computing device and may convert the received RTP (or SRTP) stream to multiple MPRTP subflows for sending to a destination computing device (also referred to as a receiving computing device). An example computing device configured to operate as an MPRTP translator may be an MPRTP retransmission server.

In various embodiments, the MPRTP translator may add MPRTP extension headers to the RTP (or SRTP) packets and forward copies of the RTP (or SRTP) packets with MPRTP extensions along different paths to the destination computing device. The sending of multiple versions of the RTP (or SRTP) packets via MPRTP along different pathways, such as two, three, four, or more different pathways, may increase reliability of the transport of the RTP (or SRTP) packets. In various embodiments, the MPRTP translator may modify the session description protocol (SDP) for the RTP (or SRTP) stream from the source computing device to include MPRTP extension information for the MPRTP transport session from the MPRTP translator to the destination computing device. The modified SDP including the MPRTP extension information may be sent from the MPRTP translator to the destination computing device. In various embodiments, the MPRTP translator may receive control packets (e.g., MP-RTCP packets) from the destination computing device and may not feed such control packets back to the source computing device. In various embodiments, in addition to, or in place of, receiving an RTP (or SRTP) stream from a source, the MPRTP translator may receive MPRTP subflows, thereby acting as an MPRTP to MPRTP translator. In various embodiments, an MPRTP translator may additionally generate its own RTP (or SRTP) streams for sending via MPRTP.

In various embodiments, when SRTP packets are received by an MPRTP translator, the MPRTP translator may add an MPRTP header extension to SRTP packets that indicates to a receiving computing device (also referred to as a destination computing device) that the rest of the header should not be processed. For example, the computing device sending the RTP stream may add ID 15 (or type 15) after the MPRTP header extension to indicate that the rest of the header should not be processed. In this manner, the SRTP encryption and authentication information may be preserved and the SRTP packet may be sent via MPRTP even though the SRTP packet header may not comply with RFC 5285. In various embodiments, the MPRTP translator may add a second authentication signature to the packet that applies to the entire MPRTP packet. For example, the second authentication signature may be part of a new Secure MPRTP protocol or SMPRTP. By adding a second authentication signature to the MPRTP packet, authentication may be applied to the entire MPRTP packet. In various embodiments, the security context for the second authentication may be negotiated between the MPRTP translator and the destination computing device, for example indicated in the SDP or any other mechanism. In various embodiments, the second authentication signature may encrypt new RTCP packets added for MPRTP sub-flow monitoring. For example, SMPRTP may encrypt the new RTCP packets added for MPRTP sub-flow monitoring purposes.

Various examples of different applications/clients, middleware, layers, stacks, radio technologies, and transport protocols are discussed herein, specifically, MPRTP, RTP, RTCP, SRTP, and Long Term Evolution (LTE). The discussions of MPRTP, RTP, RTCP, SRTP, and LTE are provided merely as examples to better illustrate the aspects of the various embodiments, and are not intended to limit the various embodiments in any way. Other applications/clients, middleware, layers, stacks, radio technologies, and transport protocols may be used with the various embodiments, and the other applications/clients, middleware, layers, stacks, radio technologies, and transport protocols may be substituted in the various examples without departing from the spirit or scope of the invention.

FIG. 1 illustrates an MPRTP network 100 suitable for use with various embodiments. The MPRTP network 100 may include two computing devices 102 and 104 configured to communicate with one another via MPRTP transport sessions. At a given time in any MPRTP transport session one computing device, such as computing device 102, may be the computing device sending MPRTP subflows to the other computing device which may receive one or more of the MPRTP subflows, such as computing device 104, via different delivery paths 106, 107, and/or 108 established via a delivery cloud 101 (e.g., the Internet, LTE networks, etc.) between the two computing devices 102 and 104. The computing device sending the MPRTP subflows, such as computing device 102, may be referred to as an MPRTP source computing device, MPRTP translator, or MPRTP server. The computing device receiving the MPRTP subflows, such as a computing device 104, may be referred to as an MPRTP destination computing device, MPRTP client, or MPRTP receiver. The different delivery paths 106, 107, and/or 108 may each be separate delivery paths through the delivery cloud 101 (e.g., delivery paths established via distinct LTE connections established by different LTE modems) routed from distinct Internet Protocol (IP) addresses of the computing device sending the MPRTP subflows, such as computing device 102, to an IP address of the computing device receiving the MPRTP subflows, such as computing device 104. In various embodiments, each MPRTP stream sent over the different delivery paths 106, 107, and/or 108 may be the same, such that should any one delivery path experience a failure, another delivery path may still provide the same MPRTP stream, thereby providing redundancy and improved quality of service. In various embodiments, the MPRTP streams may enable a receiver to recover the original RTP stream. By enabling such recovery, the various embodiments may allow a higher utilization and better reliability than current MPRTP or RTP through the use of the multiple paths that are available.

Figure 2:
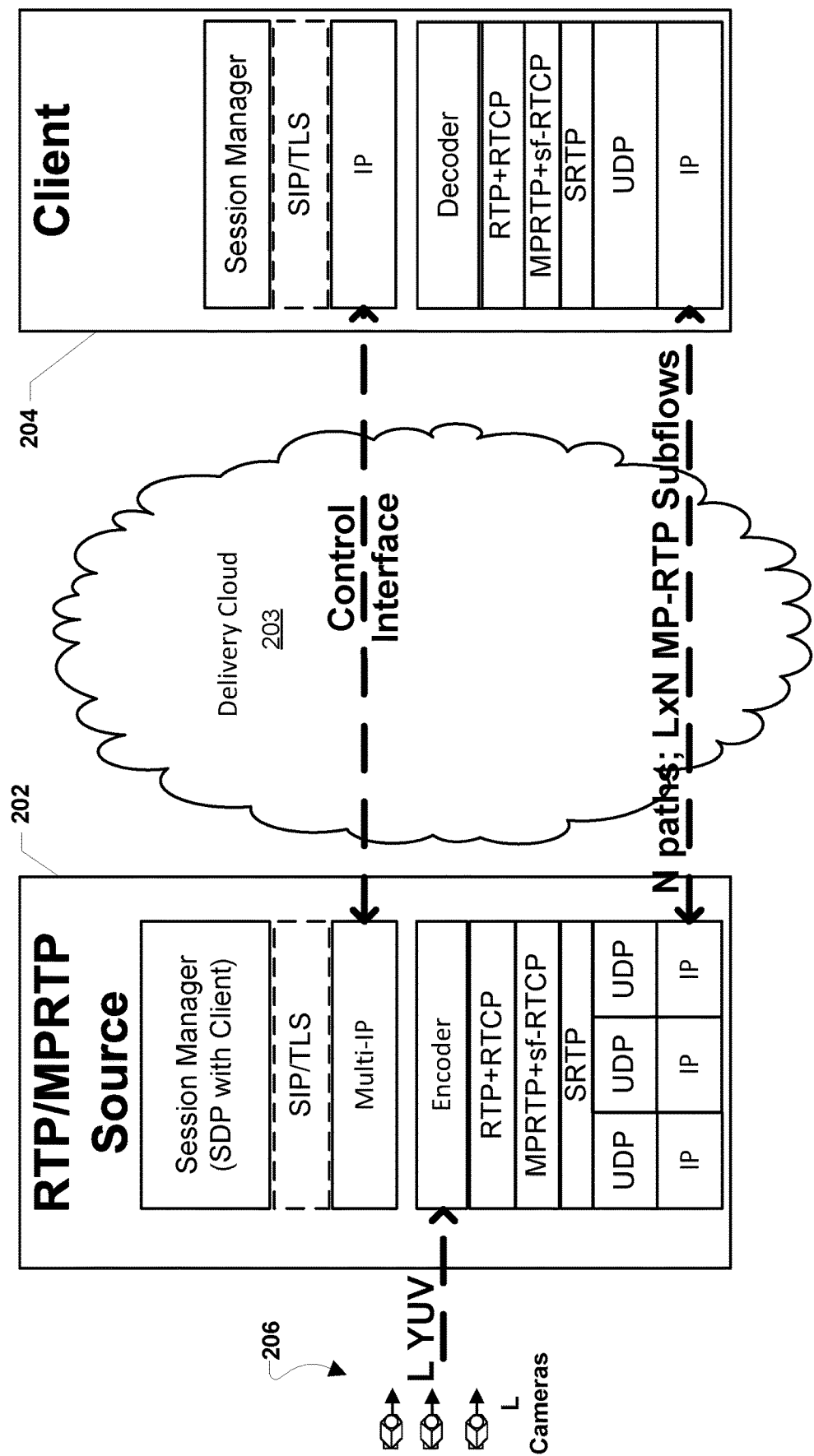
FIG. 2 is a system block diagram illustrating relationships between network elements and the computing device layers (or stacks) in a network according to various embodiments.

FIG. 2 illustrates relationships between an MPRTP source 202 and MPRTP client 204 in a network according to various embodiments. The MPRTP source 202 may receive inputs from "L" number of cameras 206, such as three cameras, at an encoder that may output a stream of media packets, such as video packets, including the inputs from each camera for transmission to the MPRTP client 204. The encoder may output the media stream to an RTP and RTCP stack (or layer), which may package the media packets as RTP packets for transport via RTP. The RTP and RTCP stack (or layer) may send the RTP stream to the MPRTP stack (or layer), which may prepare the RTP packets for transport via MPRTP. For example, the MPRTP stack (or layer) may add MPRTP extension headers to the RTP packets to generate MPRTP packets. For example, the MPRTP stack (or layer) may perform operations of the method 400 described below with reference to FIG. 4 to generate MPRTP packets. In various embodiments, the MPRTP stack (or layer) may send the MPRTP packets to an SRTP stack (or layer) where encryption and authentication may be added to the MPRTP packets. When used, SRTP may add authentication to the RTP header including any extensions, and thus the RTP header extensions defined for MPRTP may be automatically authenticated by SRTP.

The stream of packets may be spread over "N" number of streams (e.g., three streams), such that each stream may include inputs from the "L" cameras 206 in separate subflows. The "N" streams may be sent to their own respective User Datagram Protocol (UDP) stack (or layer), which may output the MPRTP subflows to respective modems for transmission via their own IP address to the IP address of the MPRTP client 204 over the delivery cloud 203, such as the Internet, LTE networks, etc. Each stream may be sent over its own delivery path, such that "N" different delivery paths may each provide "L" subflows to the MPRTP client's 204 IP address in the delivery session.

The delivery session between the MPRTP source 202 and the MPRTP client 204 may be managed by a session manager with SDP client on the MPRTP source 202 that may generate an SDP for the MPRTP transport session providing the various streams from the MPRTP source 202 to the MPRTP client 204. In this manner, the session control may be end-to-end. The SDP may be sent from the session manager of the MPRTP source 202 to the session manager of the MPRTP client 204 using the session initiation protocol (SIP) and transport layer security (TLS). The SDP may be sent via any pathway, such as a dedicated control channel between one or more IP address of the MPRTP source 202 and an IP address of the MPRTP client 204, one of the "N" different delivery paths used for the transport of the streams, or any other delivery mechanism. The MPRTP client 204 may receive the SDP from the MPRTP source 202 and receive the streams by combining the one or more of the "N" different delivery paths according to the SDP. Additionally, the SDP may indicate security contexts for the MPRTP transport session, such as SRTP encryption and authentication keys, for the MPRTP subflows.

The MPRTP client 204 may receive the MPRTP subflows sent via the "N" different delivery paths and in the opposite manner of the MPRTP source 202 pass the received MPRTP packets of the streams via a UDP stack (or layer) to an SRTP stack (or layer). When SRTP encryption is applied, the SRTP stack (or layer) may decrypt the packets and pass them to the MPRTP stack (or layer). The MPRTP stack (or layer) may remove any MPRTP extension headers as needed to reconstitute the original RTP and RTCP packets and may pass the RTP and RTCP packets to the RTP and RTCP stack (or layer). For example, the MPRTP stack (or layer) may perform operations of the method 500 described below with reference to FIG. 5 to reconstitute the original RTP or RTCP packets. The RTP and RTCP stack (or layer) may pass the packets to a decoder that may decode the packets to produce the original "L" camera inputs for further use by the MPRTP client 204. For example, the MPRTP client 204 may be a backend server that may store the original "L" camera inputs.

Figure 3:
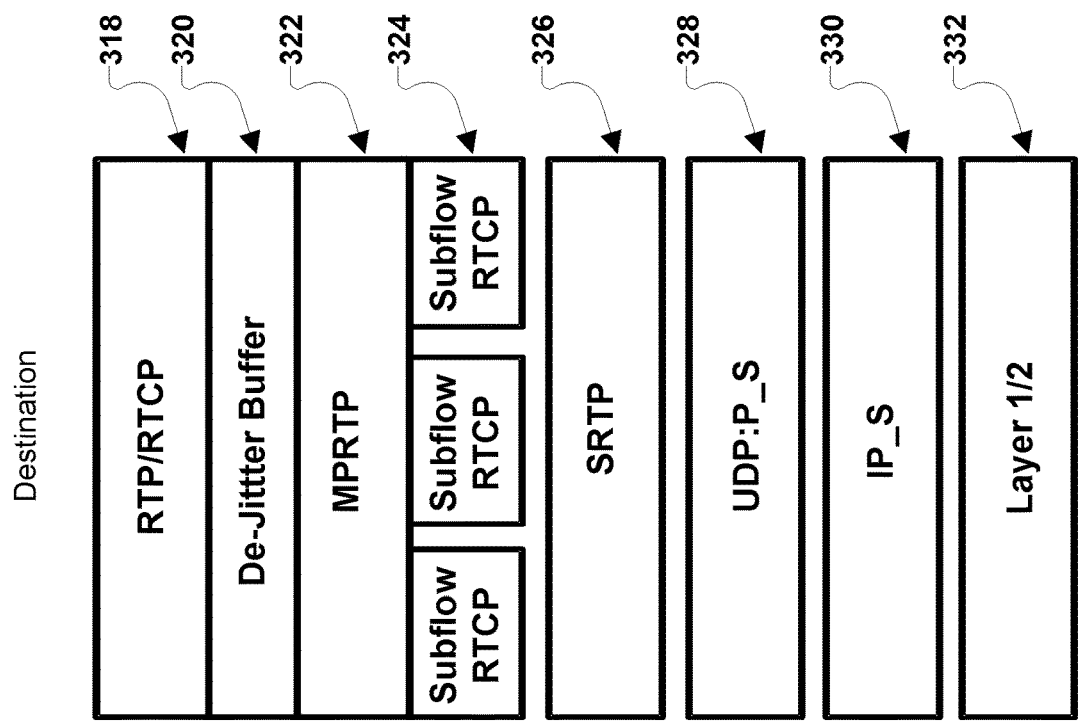
FIG. 3 is a system block diagram illustrating computing device layers (or stacks) in a source computing device and a destination computing device according to various embodiments.
Figure 3:
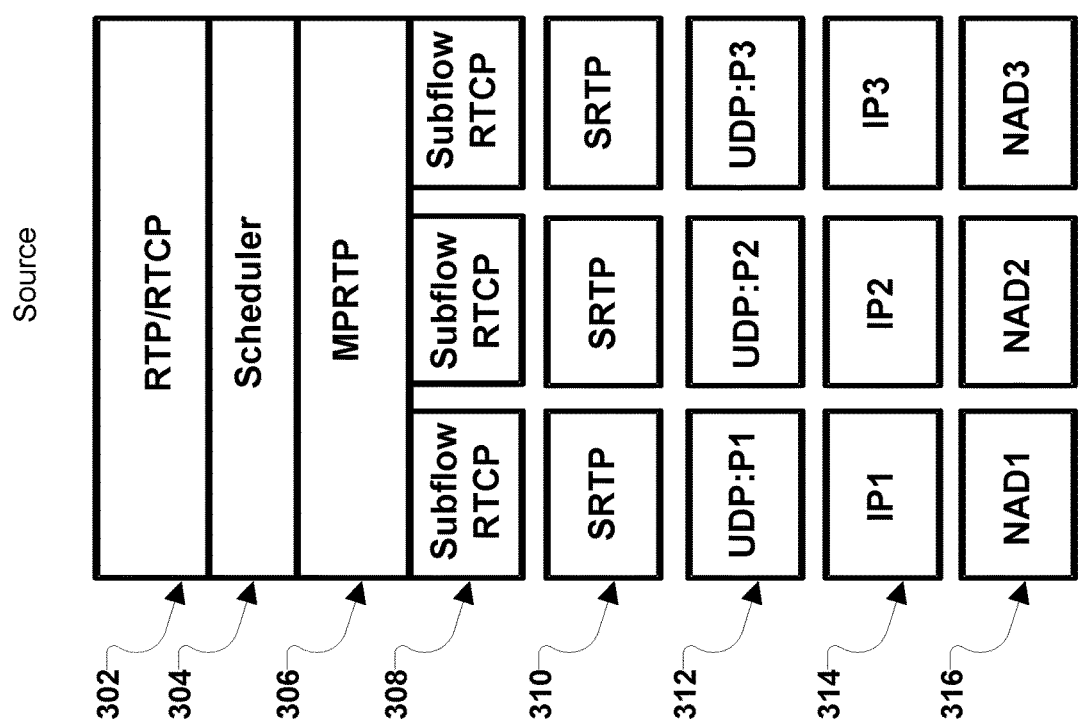

FIG. 3 is a system block diagram illustrating computing device layers (or stacks) in an MPRTP source computing device and an MPRTP destination computing device according to various embodiments. The RTP/RTCP stack (or layer) 302 of the MPRTP source computing device may output RTP packets for transport via RTP. The RTP and RTCP stack (or layer) 302 may send the RTP stream to a schedule stack (or layer) 304 which may schedule the packets for delivery to the MPRTP destination computing device. Once scheduled, the packets may be sent to the MPRTP stack (or layer) 306, which may prepare the RTP packets for transport via MPRTP. For example, the MPRTP stack (or layer) 306 may add MPRTP extension headers to the RTP packets to generate MPRTP packets. For example, the MPRTP stack (or layer) 306 may perform operations of method 400 described below with reference to FIG. 4 to generate MPRTP packets. In various embodiments, the MPRTP stack (or layer) 306 may send the streams to the SRTP stacks (or layers) 310 where encryption and authentication may be added to each MPRTP stream. In various embodiments, the RTCP control protocol of MPRTP may send the individual RTCP packets through the RTCP sub-flow modules (or layers) 308 that may monitor and control each stream. In various embodiments, the encryption and authentication keys and methods used for each MPRTP stream may be the same, such that each MPRTP stream may use the same security context. Each stream may be sent to its own respective UDP stack (or layer) 312, which may output the MPRTP subflows via respective IP addresses 314 and respective modems 316 for transmission over its own delivery path to the IP address 330 of the MPRTP destination computing device.

The MPRTP destination computing device may receive the MPRTP subflows via its various communication layers 332, such as a modem layer, which may deliver the MPRTP packets to the IP address 330 and on to the UDP stack (or layer) 328. When SRTP encryption is applied, the SRTP stack (or layer) 326 may decrypt the packets and pass them to the RTP/RTCP stacks (or layers) 324 for each respective subflow of the MPRTP stream. The subflow RTCP stacks (or layers) 324 process the sub-flow sender reports and generate subflow receiver reports. The MPRTP layer would also forward RTCP packets that describe the overall stream to the RTCP stack. The MPRTP stack (or layer) 322 may remove any MPRTP extension headers as needed to reconstitute the original RTP and RTCP packets and may pass the RTP and RTCP packets to the de jitter buffer 320 and on to the RTP/RTCP stack (or layer) 318. For example, the MPRTP stack (or layer) 322 may perform operations of method 500 described below with reference to FIG. 5 to reconstitute the original RTP or RTCP packets.

Figure 4:
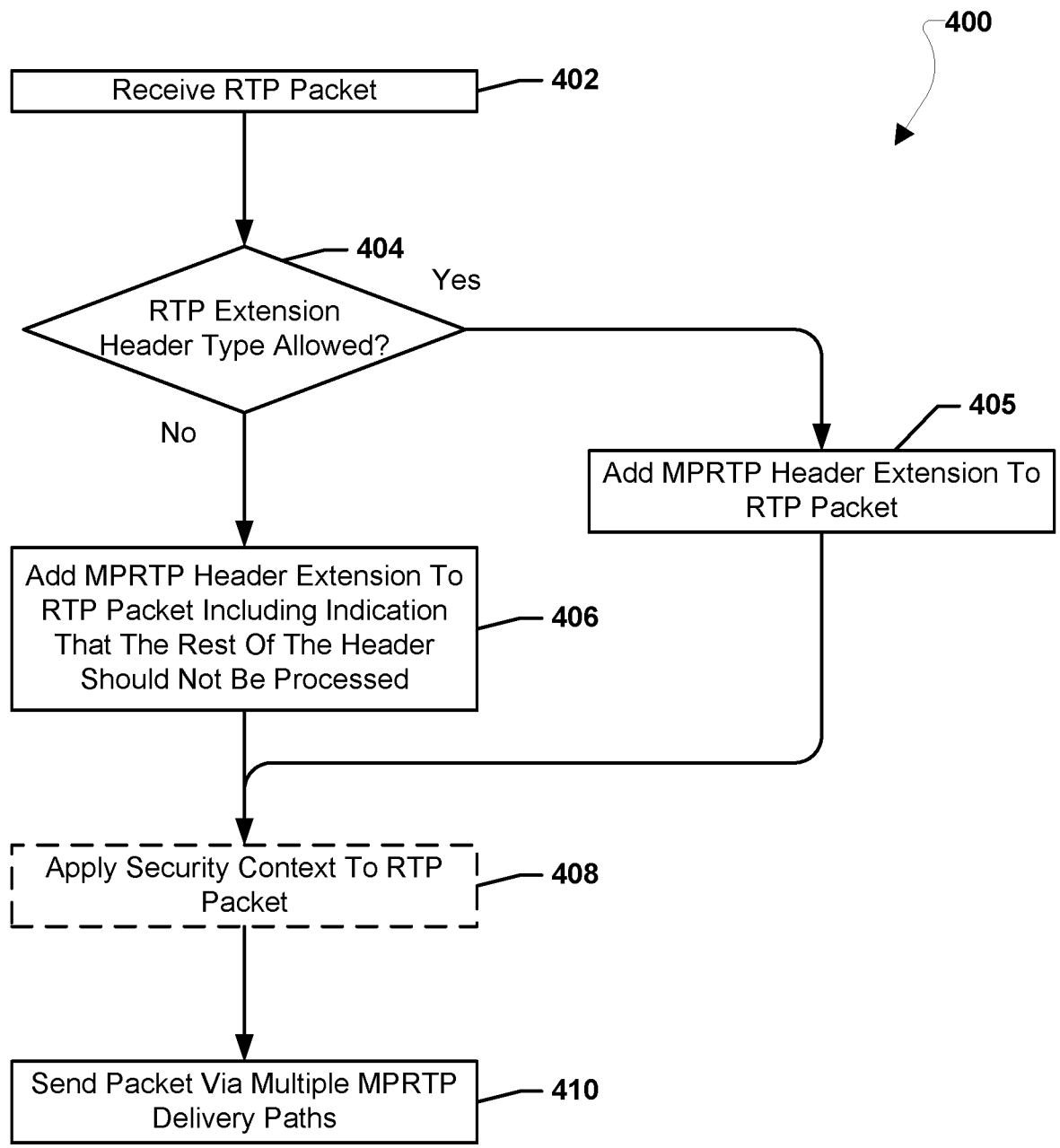
FIG. 4 is a process flow diagram illustrating an embodiment method for header preservation in Multipath Real-Time Transport Protocol (MPRTP) subflows.

FIG. 4 illustrates an embodiment method 400 for header preservation in MPRTP subflows. In various embodiments, the operations of method 400 may be performed by an MPRTP stack (or layer) running on a processor of a computing device configured to send MPRTP subflows, such as computing devices 102 (FIG. 1) and 202 (FIG. 2).

In block 402, the MPRTP stack (or layer) may receive an RTP packet.

In determination block 404 the MPRTP stack (or layer) may determine whether the RTP packet extension header type is an allowed type. For example, the MPRTP stack (or layer) may determine whether the RTP packet extension header type is an allowed type by determining whether the RTP packet extension header type is a profile type allowed by RFC 5285.

In response to determining that the RTP packet extension header type is not allowed (i.e., determination block 404="No"), the MPRTP stack (or layer) may add (e.g., prepend, insert, append, etc.) an MPRTP header extension to the RTP packet including an indication that the rest of the header should not be processed in block 406. For example, an MPRTP header may be added in a 0xBEDE type extension with an ID 15 after the MPRTP header extension followed with the original RTP packet extension header. Per RFC 5285 any data after ID 15 may be ignored by a receiving MPRTP computing device, thereby ensuring the original RTP packet extension header may remain intact when transported. In various embodiments, padding may be added to ensure the original extension header starts at the beginning of a 4-byte word.

In response to determining that the RTP packet extension header type is allowed (i.e., determination block 404="Yes"), the MPRTP stack (or layer) may add (e.g., prepend, insert, append, etc.) an MPRTP header extension to the RTP packet in block 405. For example, the MPRTP header may be a header that does not include an indication that the rest of the header should not be processed because the RTP packet extension header type is allowed by RFC 5285.

In response to adding an MPRTP header extension to the RTP packet in block 405 or 406, the MPRTP stack (or layer) may optionally apply a security context to the packet in block 408. For example, SRTP authentication and encryption may be applied to the packet. In some embodiments, the SRTP authentication and encryption may be applied by the MPRTP stack (or layer). In other embodiments, the SRTP authentication and encryption may be applied by a dedicated SRTP stack (or layer). Applying a security context to the packet may be optional, as security may not be needed in every transport session. When security is applied after the MPRTP extension header is added, the security context may apply to both the packet payload and packet header. In various embodiments, security contexts may be negotiated between MPRTP sources and clients through a primary link and applied to all MPRTP subflows.

In block 410, the MPRTP stack (or layer) may send the packet via multiple MPRTP delivery paths to an MPRTP destination computing device's IP address.

Figure 5:
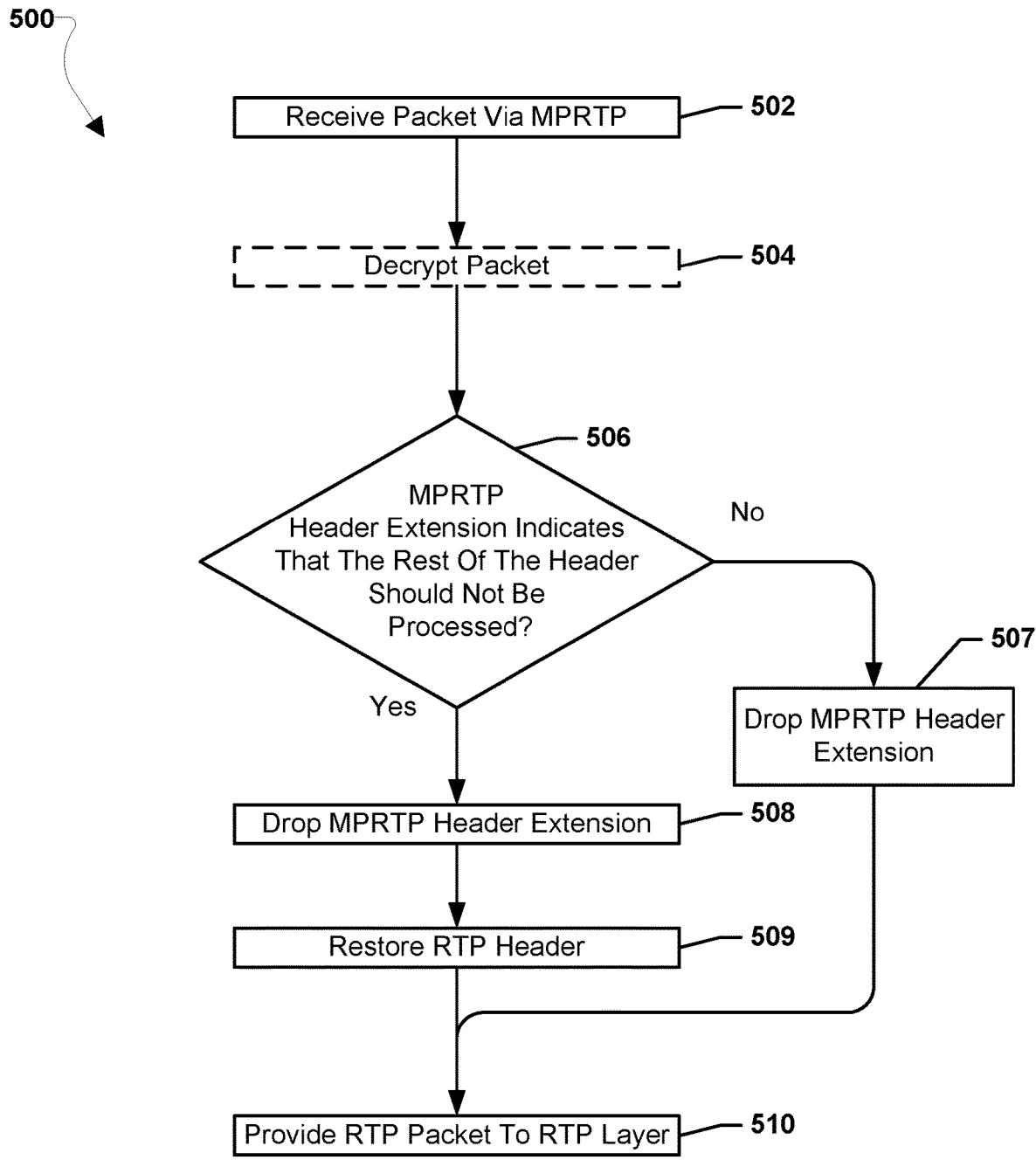
FIG. 5 is a process flow diagram illustrating an embodiment method for reconstituting a Real-time Transport Protocol (RTP) header from an MPRTP stream.

FIG. 5 illustrates an embodiment method 500 for reconstituting a RTP header from an MPRTP stream. In various embodiments, the operations of method 500 may be performed by an MPRTP stack (or layer) running on a processor of a computing device configured to receive MPRTP subflows, such as computing devices 104 (FIG. 1) and 204 (FIG. 2). In various embodiments, the operations of method 500 may be performed in conjunction with the operations of method 400 described with reference to FIG. 4.

In block 502, the MPRTP stack (or layer) may receive a packet via MPRTP. In optional block 504, the MPRTP stack (or layer) may decrypt the packet. For example, in embodiments where SRTP encryption is applied, the MPRTP stack (or layer) or an SRTP stack (or layer) may decrypt the packet.

In determination block 506, the MPRTP stack (or layer) may determine whether the MPRTP header extension indicates that the rest of the header should not be processed. For example, the MPRTP stack (or layer) may determine whether the MPRTP header extension indicates that the rest of the header should not be processed when the MPRTP header extension includes an ID 15.

In response to determining that the MPRTP header extension indicates that the rest of the header should not be processed (i.e., determination block 506="Yes"), the MPRTP stack (or layer) may drop the MPRTP header extension in block 508. In this manner, an added MPRTP header extension and the extension ID=15 header, as well as any associated padding may be removed, thereby reconstituting the original RTP packet that includes an RTP packet extension header type that is not allowed by RFC 5285. In response to dropping the MPRTP header extension, the MPRTP stack (or layer) may restore the RTP header in block 509. For example, the MPRTP stack (or layer) may write or reformat the data after the extension ID=15 header to form the RTP header, thereby reconstituting the original RTP packet extension header. This reconstituted original RTP packet extension header type may have been an RTP packet extension type not allowed by RFC 5285.

In response to determining that the MPRTP header extension does not indicate that the rest of the header should not be processed (i.e., determination block 506="No"), the MPRTP stack (or layer) may drop the MPRTP header extension in block 507.

In response to dropping the MPRTP header extension in block 507 or in response to restoring the RTP header in block 509, the MPRTP stack (or layer) may provide the RTP packet to a RTP layer in block 510.

Figure 6A:
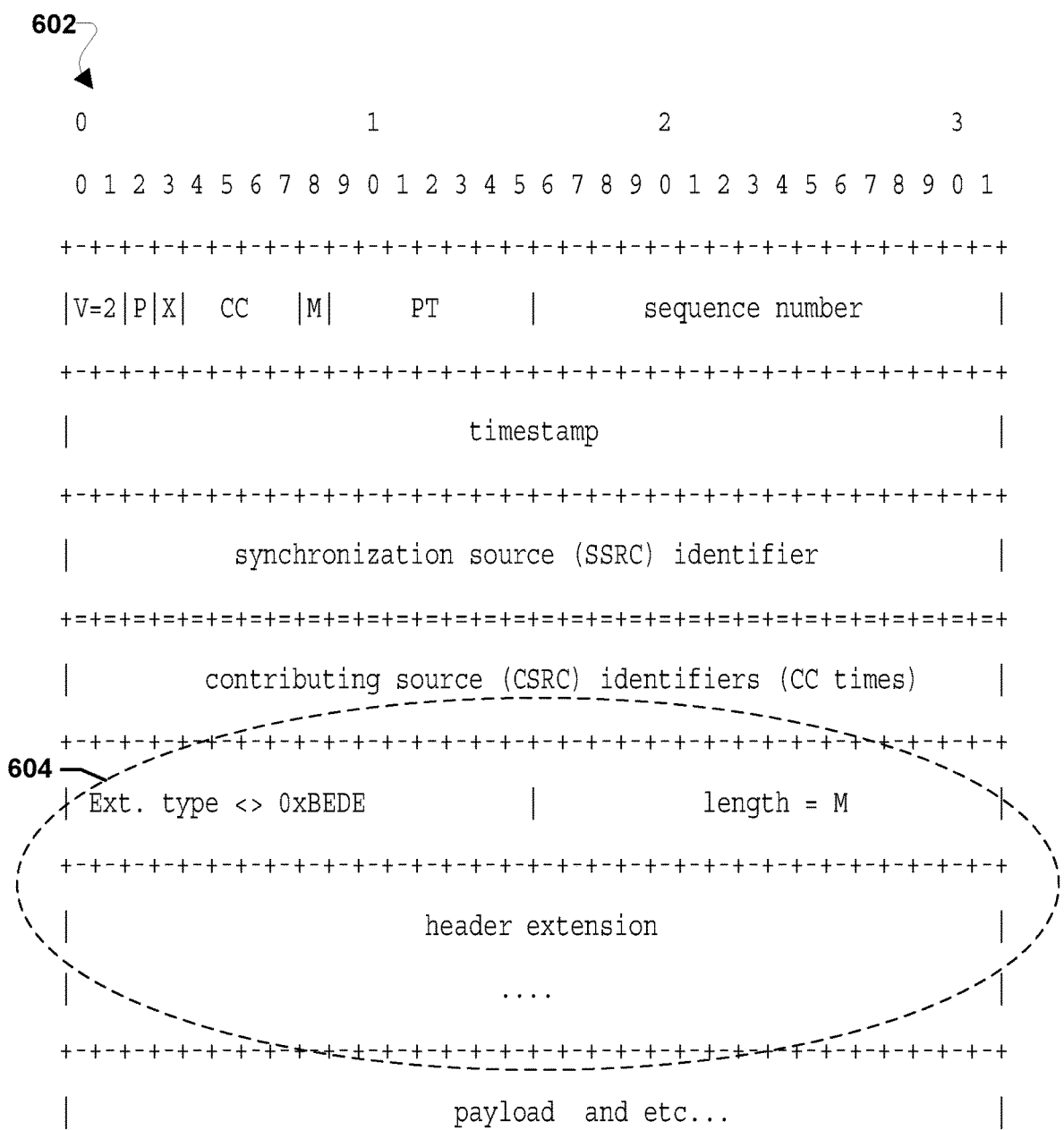
FIG. 6A shows the structure of an RTP packet according to an embodiment.
Figure 6B:
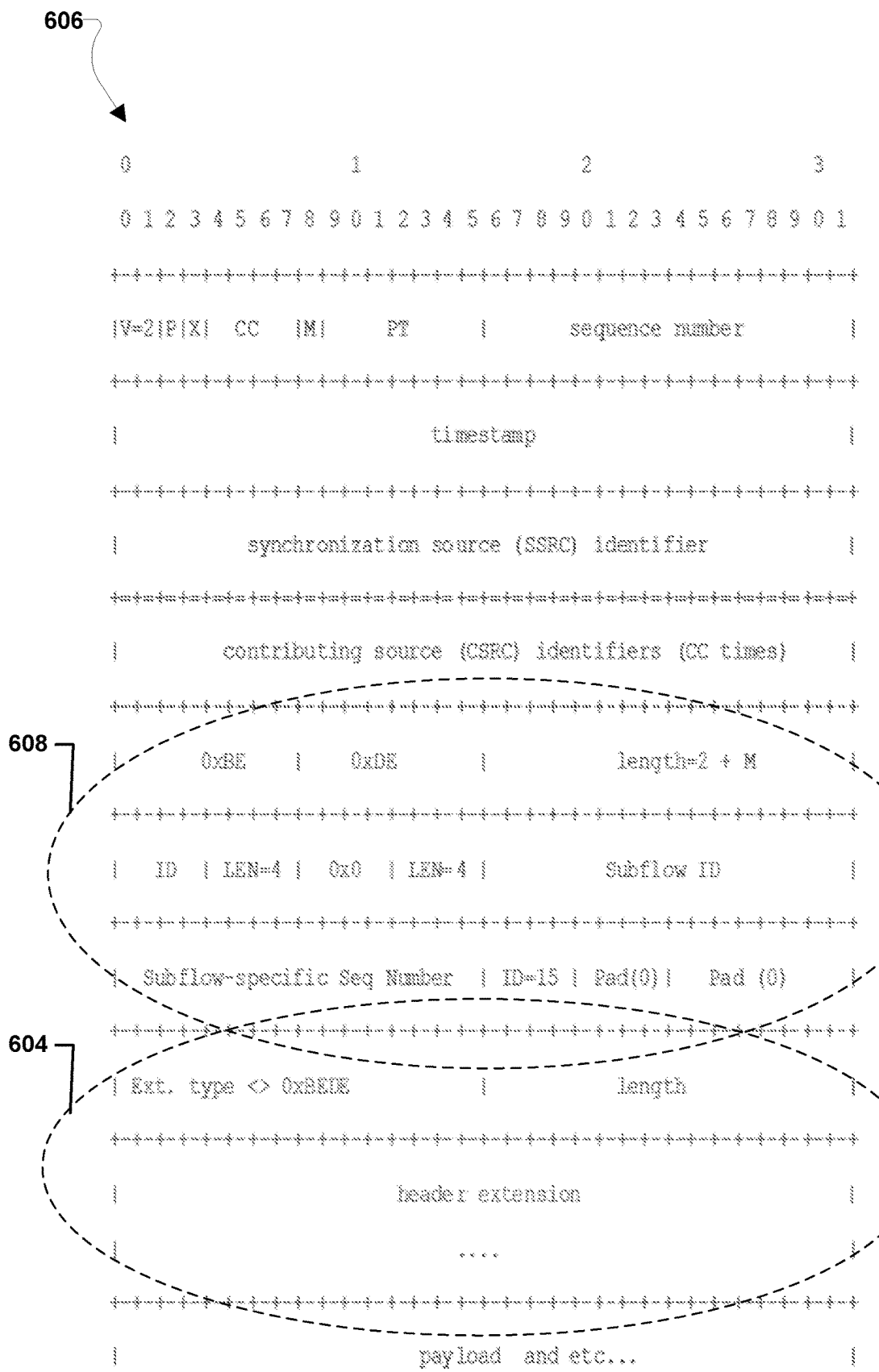
FIG. 6B shows the structure of the RTP packet of FIG. 6A with an MPRTP header extension added according to an embodiment.

FIG. 6A is an example schema of an RTP packet 602 according to an embodiment. For example, the RTP packet 602 may be an RTP packet that includes an RTP packet extension header 604 that has a type that is not allowed by RFC 5285. FIG. 6B is an example schema of an RTP packet 606 that is the RTP packet 602 of FIG. 6A with an MPRTP header extension 608 added according to an embodiment.

For example, the MPRTP header extension 608 may be added by an MPRTP layer (or stack) performing the operations of method 400 described above with reference to FIG. 4. The MPRTP header extension 608 may be a 0xBEDE type extension with an ID 15 after the MPRTP header extension followed with the original RTP packet extension header 604. In this manner, an MPRTP destination computing device receiving the RTP packet 606 may remove the MPRTP header extension 608 and reconstitute (or restore) the original RTP packet 602. For example, the MPRTP header extension 608 may be removed by an MPRTP layer (or stack) performing the operations of method 500 described above with reference to FIG. 5.

Figure 7:
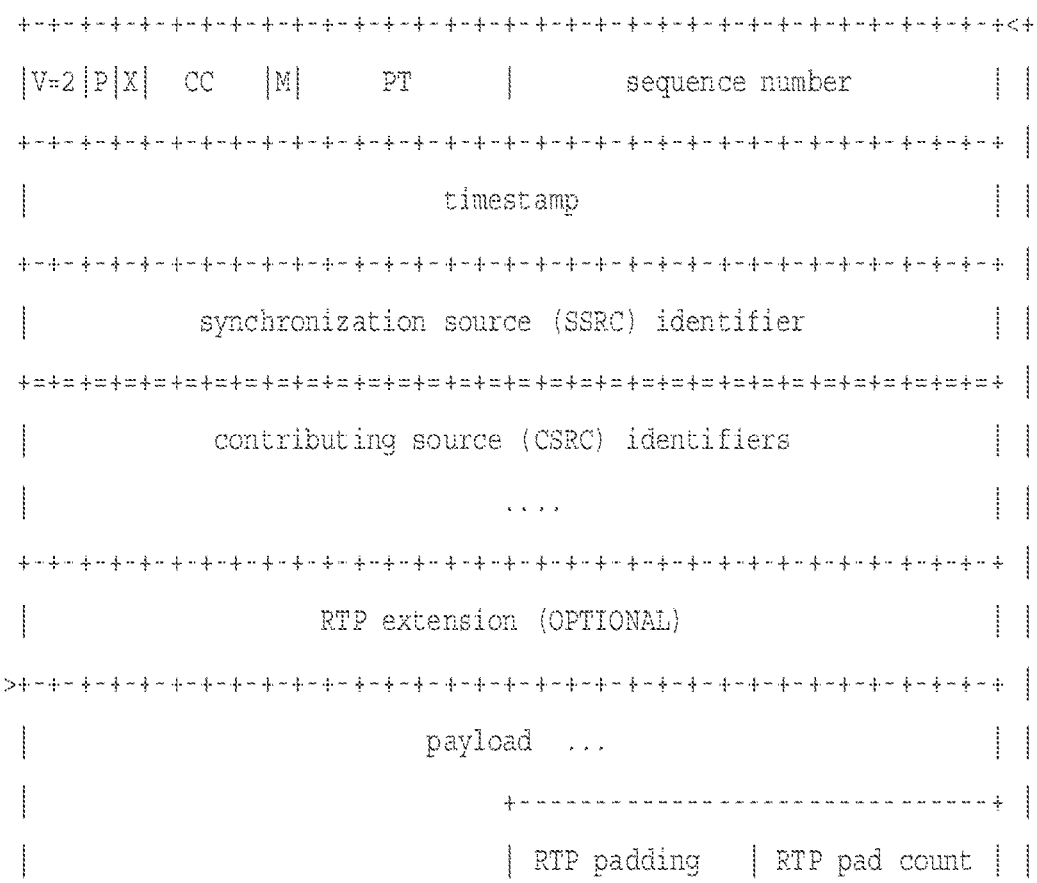
FIG. 7 shows the structure of an MPRTP packet secured by secure RTP (SRTP) according to an embodiment.
Figure 7:
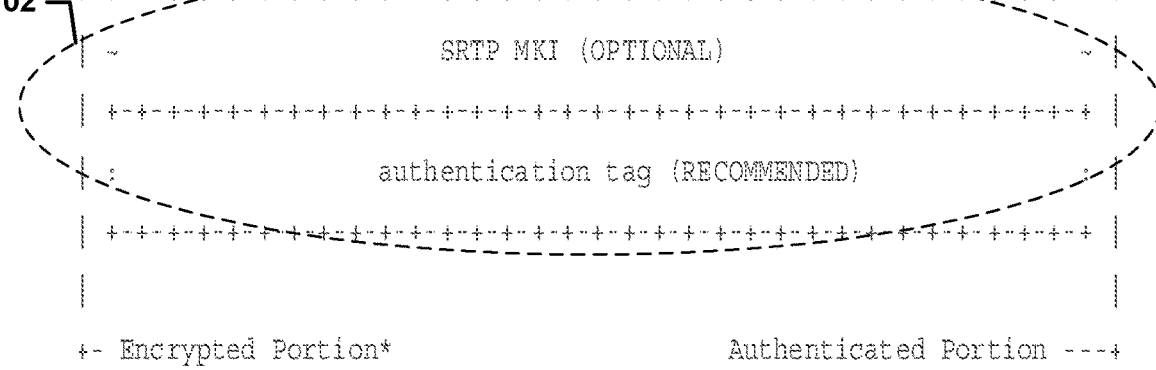

FIG. 7 is an example schema of an MPRTP packet 700 secured by SRTP according to an embodiment. For example, the MPRTP packet 700 secured by SRTP may be generated by an MPRTP layer (or stack) or SRTP layer (or stack) performing operations of method 400 described above with reference to FIG. 4. In various embodiments, the security context may apply to both the packet payload and packet header. For example, the SRTP master key indicator (MKI) 702 may be indicated in the MPRTP packet 700 such that a receiving MPRTP device may use the correct key to decrypt the packet 700.

Figure 8:
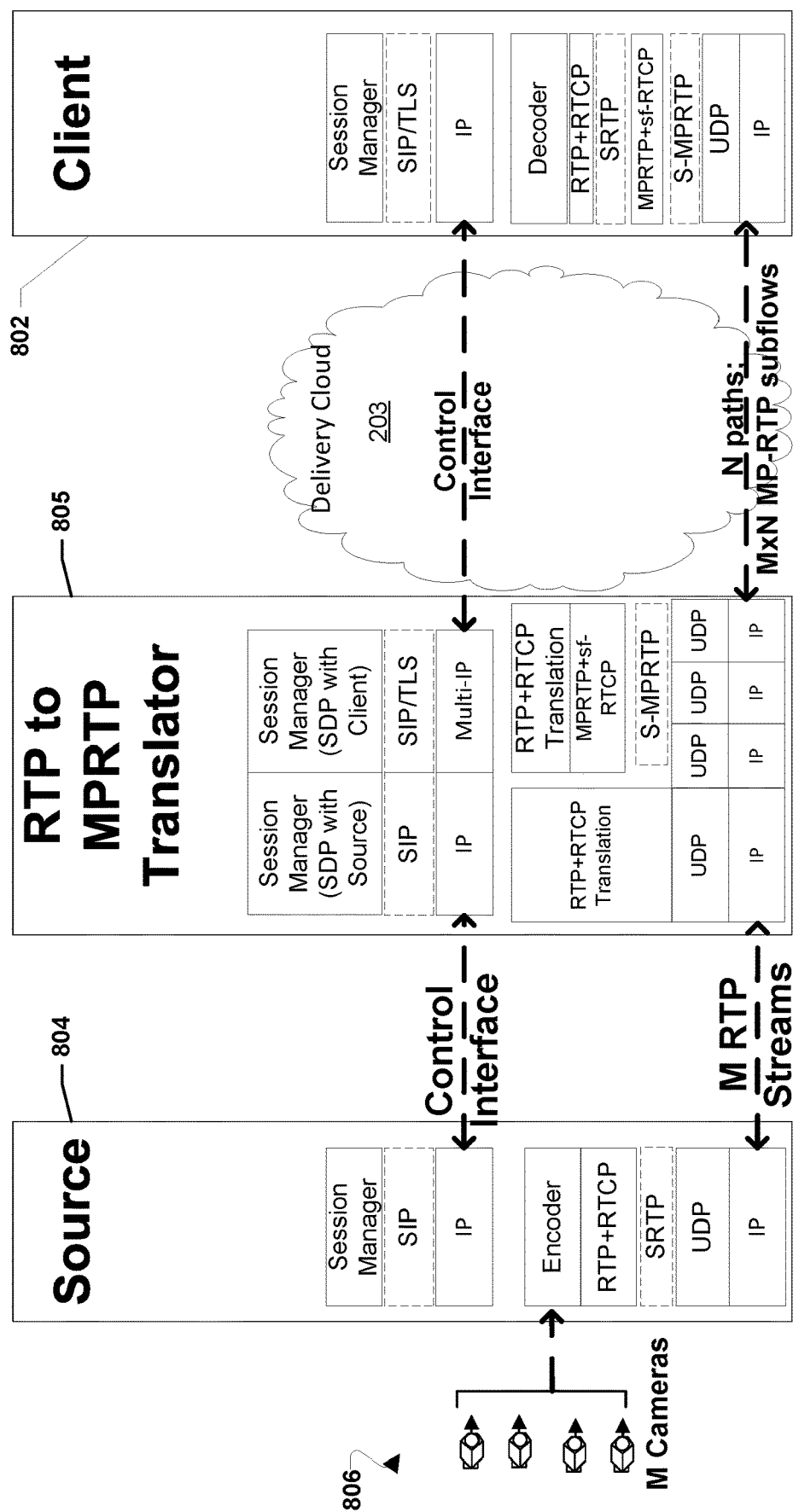
FIG. 8 is a system block diagram illustrating relationships between network elements and the computing device layers (or stacks) in a network according to various embodiments.

FIG. 8 illustrates relationships between a RTP source 804, MPRTP translator 805, and MPRTP client 802 in a network according to various embodiments. The RTP source 804 may receive inputs from "M" number of cameras, such as four cameras, and via an encoder, RTP/RTCP stack (or layer), SRTP stack (or layer), UDP stack (or layer), and IP stack (or layer) (e.g., via an Ethernet connection), output a number "M" of RTP streams to the MPRTP translator 805. In some embodiments, the RTP streams output by the RTP source 804 may be MPRTP streams and/or SMPRTP streams. The RTP transport session between the RTP source 804 and MPRTP translator 805 may be controlled by the session manager of the RTP source 804 which may generate and send a SDP for the session to the MPRTP translator 805. A session manager at the MPRTP translator 805 may receive the SDP from the RTP source 804.

The MPRTP translator 805 may receive the SDP from the RTP source 804 and according to the SDP receive the "M" RTP streams. An example computing device configured to operate as an MPRTP translator 805 may be an MPRTP retransmission server. The MPRTP translator may pass the received RTP streams to an RTP and RTCP stack (or layer) that may send the RTP stream to the MPRTP stack (or layer) for preparation for transport via MPRTP. For example, the MPRTP stack (or layer) may add MPRTP extension headers to the RTP packets to generate MPRTP packets. For example, the MPRTP stack (or layer) may perform operations of the method 400 described above with reference to FIG. 4 to generate MPRTP packets. In various embodiments, the MPRTP stack (or layer) may send the MPRTP packets to a SMPRTP stack (or layer) where encryption and authentication may be added to the MPRTP packets. In various embodiments, the encryption and authentication added by the SMPRTP stack (or layer) may be a second authentication signature, in addition to the SRTP signature added to the RTP packet at the RTP source 804, and may apply to the entire MPRTP packet The stream of packets may be delivered in "N" streams (e.g., three streams), such that each stream may inputs from the "M" cameras 806 in a separate subflow. In various embodiments, the streams may carry disjointed information, redundant information, a mix of disjointed and redundant packets or a mix of original packets and repair packets. For example, a mix of original packets and repair packets may be carried when Forward Error Correction (FEC) is applied. The "N" streams may be sent to their own respective User Datagram Protocol (UDP) stack (or layer), which may output the MPRTP subflows to respective modems for transmission via their own IP address to the IP address of the MPRTP client 802 over the delivery cloud 203, such as the Internet, LTE networks, etc. Each stream may be sent over its own delivery path, such that "N" different delivery paths may provide the "M" subflows to the MPRTP client 802's IP address in the delivery session.

The delivery session between the MPRTP translator 805 and the MPRTP client 802 may be managed by the session manager on the MPRTP translator 805. The session manager of the MPRTP translator 805 may modify the SDP received from the RTP source 804 to add MPRTP extension information. In this manner, the modified SDP sent from the MPRTP translator 805 to the MPRTP client 802 may describe the MPRTP session between the MPRTP translator 805 and the MPRTP client 802. In this manner, the session control may be achieved end-to-end. The SDP may be sent from the session manager of the MPRTP translator 805 to the session manager of the MPRTP client 802 using the session initiation protocol (SIP) and transport layer security (TLS). The SDP may be sent via any pathway, such as a dedicated control channel between one or more IP address of the MPRTP translator 805 and an IP address of the MPRTP client 802, one of the "N" different delivery paths used for the transport of the streams, or any other delivery mechanism. The MPRTP client 802 may receive the modified SDP from the MPRTP translator 805 and receive the streams via one or more of the "N" different delivery paths according to the modified SDP. Additionally, the SDP may indicate security contexts for the MPRTP transport session, such as SRTP encryption and authentication applied by the RTP source 804 and the SMPRTP encryption and authentication applied by MPRTP translator 805.

The MPRTP client 802 may receive the MPRTP subflows sent via the "N" different delivery paths and pass the received MPRTP packets of the streams via a UDP stack (or layer) to an SMPRTP stack (or layer). When SMPRTP encryption is applied, the SMPRTP stack (or layer) may decrypt the packets and pass them to the MPRTP stack (or layer). The MPRTP stack (or layer) may remove any MPRTP extension headers as needed to reconstitute the original RTP and RTCP packets and may pass packets to the SRTP stack (or layer) as needed. For example, the MPRTP stack (or layer) may perform operations of method 500 described below with reference to FIG. 5 to reconstitute the original RTP or SRTP packets generated by the RTP source 804 and received at the MPRTP translator 805. When SRTP encryption is applied, the SRTP stack (or layer) may decrypt the packets and pass the decrypted packets to the RTP and RTCP packets to the RTP and RTCP stack (or layer). The RTP and RTCP stack (or layer) may pass the packets to a decoder that may decode the packets to produce the original "M" camera inputs for further use by the MPRTP client 802. For example, the MPRTP client 802 may be a backend server that may store the original "M" camera inputs.

Figure 9:
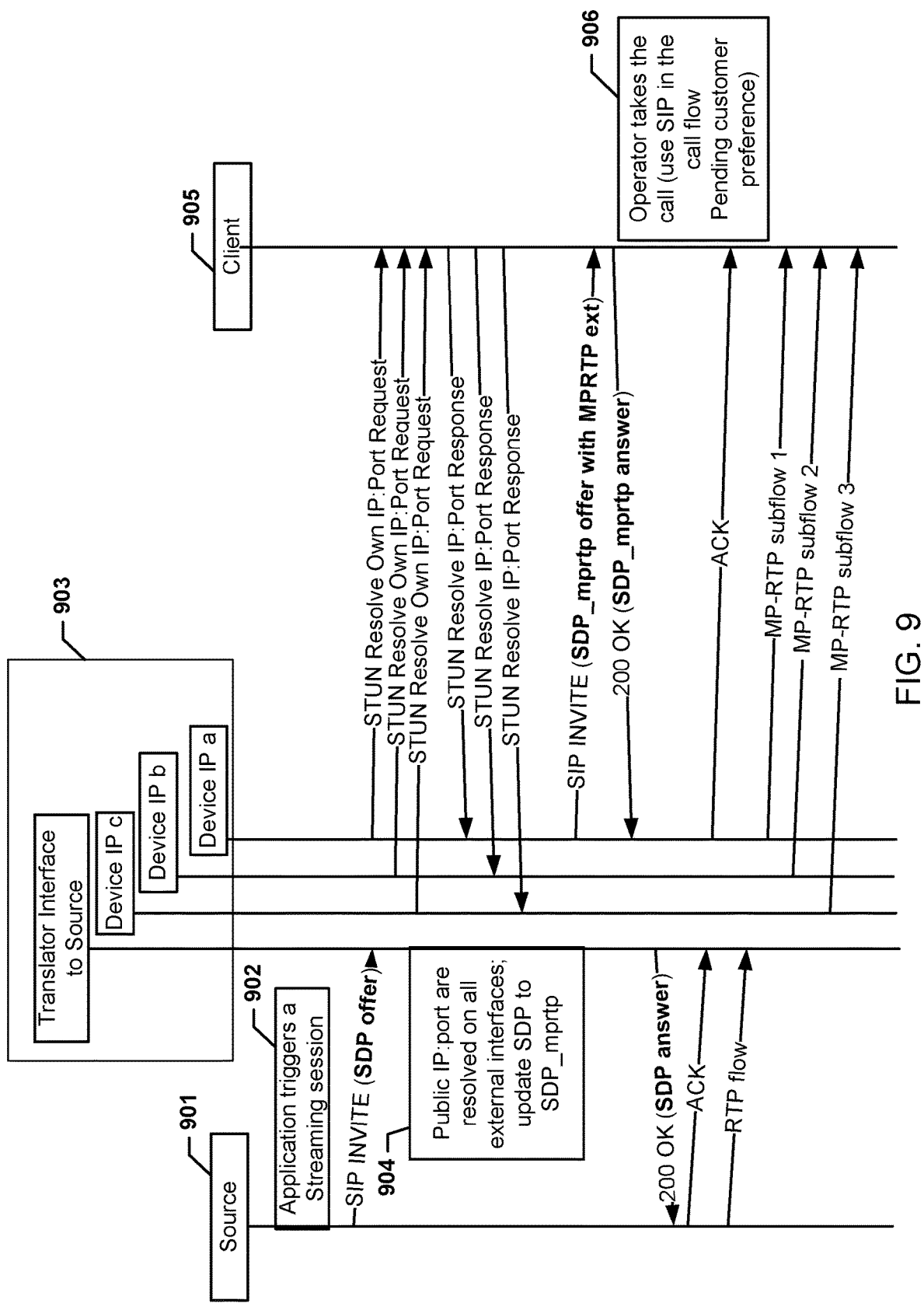
FIG. 9 is a call flow diagram illustrating interactions between a source computing device, MPRTP translator, and destination computing device to establish an MPRTP transport session according to an embodiment.

FIG. 9 is a call flow diagram illustrating interactions between a source computing device 901, MPRTP translator 903, and destination (or client) computing device 905 to establish an MPRTP transport session according to an embodiment. To initiate the MPRTP transport session an application at the source computing device 901 may trigger a streaming session at operation 902. The triggering of the streaming session may cause the source computing device 901 to send a SIP invite with SDP offer for the session to the translator interface of the MPRTP translator 903. In response to receiving the SIP invite, the MPRTP translator 903 may send IP port requests from each of its IP stacks a, b, and c to the destination computing device 905. The destination computing device 905 may send port responses to the IP stacks a, b, and c of the MPRTP translator 903.

Once the IP port requests are resolved (904), the MPRTP translator 903 may modify the SDP received from the source computing device 901 to reflect the IP address for the destination computing device 905 and any other information needed for the MPRTP transport session between the MPRTP translator 903 and the destination computing device 905. The MPRTP translator 903 may send the modified SDP with the MPRTP extension to the destination computing device 905 and the destination computing device 905 may respond acknowledging receipt of the SDP. The MPRTP translator 903 may reply to the source computing device 901 acknowledging receipt of the SDP in response to receiving acknowledgment from the destination computing device 905.

The source computing device 901 may acknowledge the transport session and begin the RTP flow to the MPRTP translator 903. The MPRTP translator 903 may acknowledge the transport session to the destination computing device 905, which may begin the transport session using a call flow mechanism according to a user preference 906. The MPRTP translator 903 may then send the MPRTP subflows to the destination computing device 905.

FIG. 10A is an example schema of a RTP SDP 1000 according to an embodiment. The RTP SDP 1000 may include an IP address 1002 for the RTP session and media descriptions 1004 and 1006 for the RTP streams in the RTP session. For example, the RTP SDP 1000 may be generated by a RTP source, such as RTP source 804 or 901, and sent to an MPRTP translator, such as MPRTP translator 805 or 903. FIG. 10B is an example schema of a modified RTP SDP 1008 which may be the RTP SDP 1000 of FIG. 10A modified to include MPRTP extension information in "a" code lines 1010 and 1012, as well as an IP address 1001 and media descriptions 1003 and 1005 modified to reflect the MPRTP translator, such as MPRTP translator 805 or 903, as the provisioning device. The MPRTP extension information in the "a" code lines 1010 and 1012 reflects the MPRTP translation of the RTP SDP such that the SDP may support MPRTP streaming. For example, the modified RTP SDP 1008 may be generated by an MPRTP translator, such as MPRTP translator 805 or 903, and sent to an MPRTP destination computing device, such as MPRTP client 802, destination computing device 905, etc.

Figure 11:
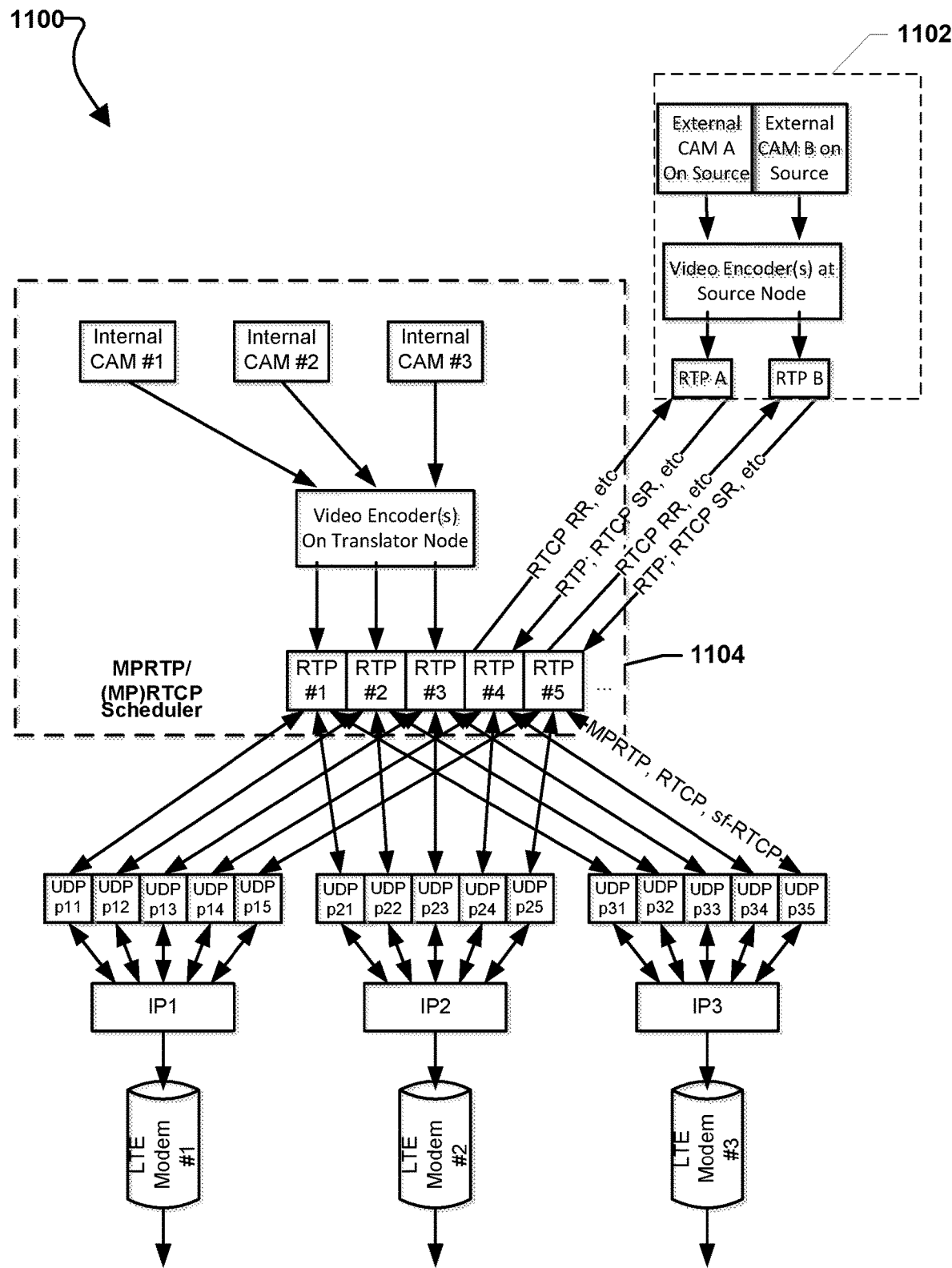
FIG. 11 is a system block diagram illustrating relationships between network elements and the computing device layers (or stacks) in a network according to various embodiments.

FIG. 11 illustrates relationships between a source computing device 1102 and an MPRTP translator 1104 in a network 1100 according to various embodiments. The source computing device 1102 and MPRTP translator 1104 may be similar to the RTP source 804 and MPRTP translator 805 described above with reference to FIG. 8, except that in addition to receiving RTP streams from the source computing device 1102, the MPRTP translator 1104 may also encode and generate its own RTP streams from internal cameras 1, 2, and 3. The RTP streams from the source computing device 1102 and the self-generated RTP streams of the MPRTP translator 1104 may be combined and handled by the MPRTP translator as subflows as described above with reference to FIG. 8. In various embodiments, the MPRTP translator 1104 may translate the incoming RTP packets into a series of subflows and may generate control packets, such as RTCP packets, on a subflow basis (i.e., sf-RTCP packets). In this manner, the RTCP subflow sender and receiver reports may be generated on a per path basis. The MPRTP translator 1104 may relay sf-RTCP sender reports to the destination computing device, and sf-RTCP packets may not be forwarded from the MPRTP translator 1104 to the source computing device 1102. While described above with reference to RTP to MPRTP translation, the same operations as described in FIGS. 8, 9, 10, and 11 may be used for MPRTP-to-MPRTP translation.

Figure 12:
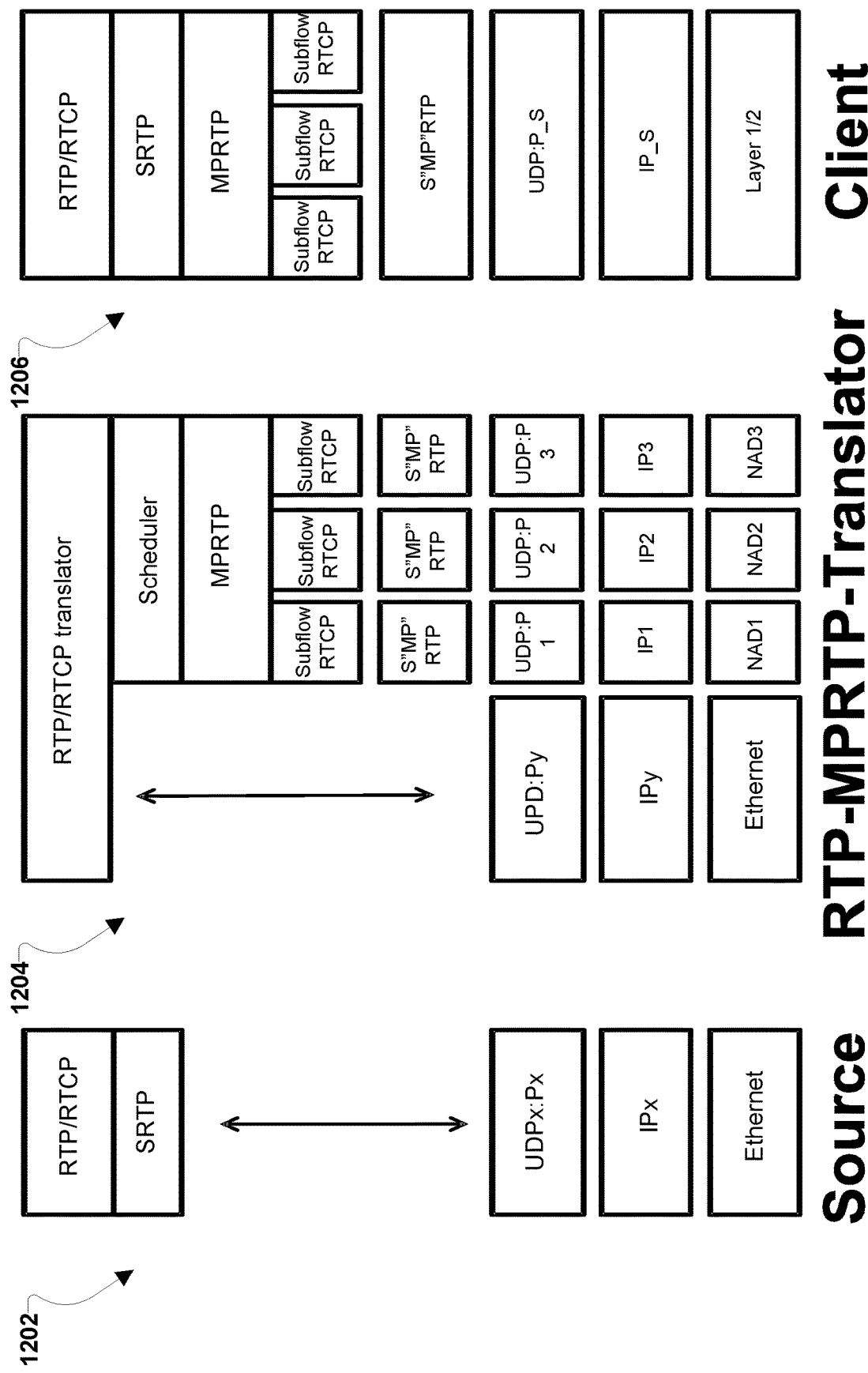
FIG. 12 is a system block diagram illustrating computing device layers (or stacks) in a source computing device, and MPRTP translator, and a destination computing device according to various embodiments.

FIG. 12 illustrates computing device layers (or stacks) in a source computing device 1202, and MPRTP translator 1204, and a destination computing device 1206 according to various embodiments. The source computing device 1202 may include an RTP/RTCP stack (or layer), SRTP stack (or layer), UDP stack (or layer), and Ethernet stack (or layer) that may output RTP streams to the MPRTP translator's 1204 Ethernet stack (or layer).

The MPRTP translator 1204 may pass the received RTP streams to an RTP and RTCP stack (or layer) that may send the RTP stream to a scheduler and on to the MPRTP stack (or layer) for preparation for transport via MPRTP. For example, the MPRTP stack (or layer) may add MPRTP extension headers to the RTP packets to generate MPRTP packets. For example, the MPRTP stack (or layer) may perform operations of the method 400 described above with reference to FIG. 4 to generate MPRTP packets. The MPRTP packets may be sent to RTCP stacks (or layers) on a per-subflow basis. Each RTCP stack (or layer) may send the MPRTP packets to a SMPRTP stack (or layer) where encryption and authentication may be added to the MPRTP packets. In various embodiments, the encryption and authentication added by the SMPRTP stack (or layer) may be a second authentication signature, in addition to the SRTP signature added to the RTP packet at the source computing device 1202, and may apply to the entire MPRTP packet. The MPRTP subflows may be sent to their own respective User Datagram Protocol (UDP) stack (or layer), which may output the MPRTP subflows to respective modems for transmission via their own IP address to the IP address of the MPRTP client (e.g., destination computing device 1206). While illustrated as a separate stack (or layer) in FIG. 12, in other embodiments, the scheduler may be part of the MPRTP stack (or layer).

The MPRTP client (e.g., destination computing device 1206) may receive the MPRTP subflows sent via the different delivery paths and pass the received MPRTP packets of the streams via a UDP stack (or layer) to an SMPRTP stack (or layer). When SMPRTP encryption is applied, the SMPRTP stack (or layer) may decrypt the packets and pass them to the MPRTP stack (or layer). In various embodiments, the MPRTP stack may also include subflow RTCP processing to manage the RTCP control packets defined as part of the MPRTP protocol for monitoring the link conditions on the subflows. The MPRTP stack (or layer) may remove any MPRTP extension headers as needed to reconstitute the original RTP packets and may pass packets to the SRTP stack (or layer) as needed. For example, the MPRTP stack (or layer) may perform operations of method 500 described below with reference to FIG. 5 to reconstitute the original RTP or SRTP packets generated by the RTP source (e.g., source computing device 1202) and received at the MPRTP translator 1204. When SRTP encryption is applied, the SRTP stack (or layer) may decrypt the packets and pass the decrypted packets RTP packets to the RTP and RTCP stack (or layer).

Figure 13:
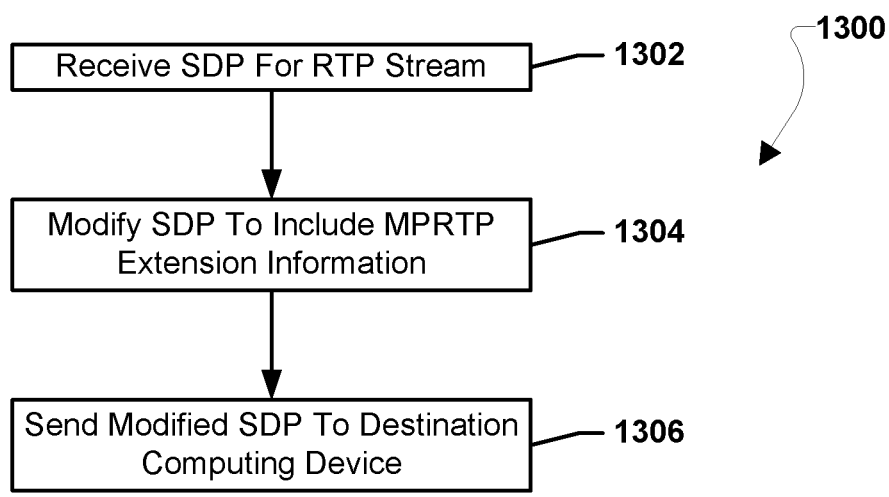
FIG. 13 is a process flow diagram illustrating an embodiment method for modifying and SDP to include MPRTP extension information.

FIG. 13 illustrates an embodiment method 1300 for modifying and SDP to include MPRTP extension information. In various embodiments, the operations of method 1300 may be performed by a session manager running on a processor of a computing device configured to send MPRTP subflows, such as MPRTP translators 805, 903, or 1204. In various embodiments, the operations of method 1300 may be performed in conjunction with the operations of method 400 described with reference to FIG. 4.

In block 1302, the session manager may receive an SDP for an RTP stream. For example, the SDP may be similar to RTP SDP 1000 described with reference to FIG. 10A. In block 1304, the session manager may modify the SDP to include MPRTP extension information. For example, MPRTP extension information may include adding "a" code lines that reflect the MPRTP translation of the RTP SDP such that the SDP may support MPRTP streaming. The modified SDP may be similar to modified RTP SDP 1008 described with reference to FIG. 10B. In block 1306, the session manager may send the modified SDP to a destination computing device.

Figure 14:
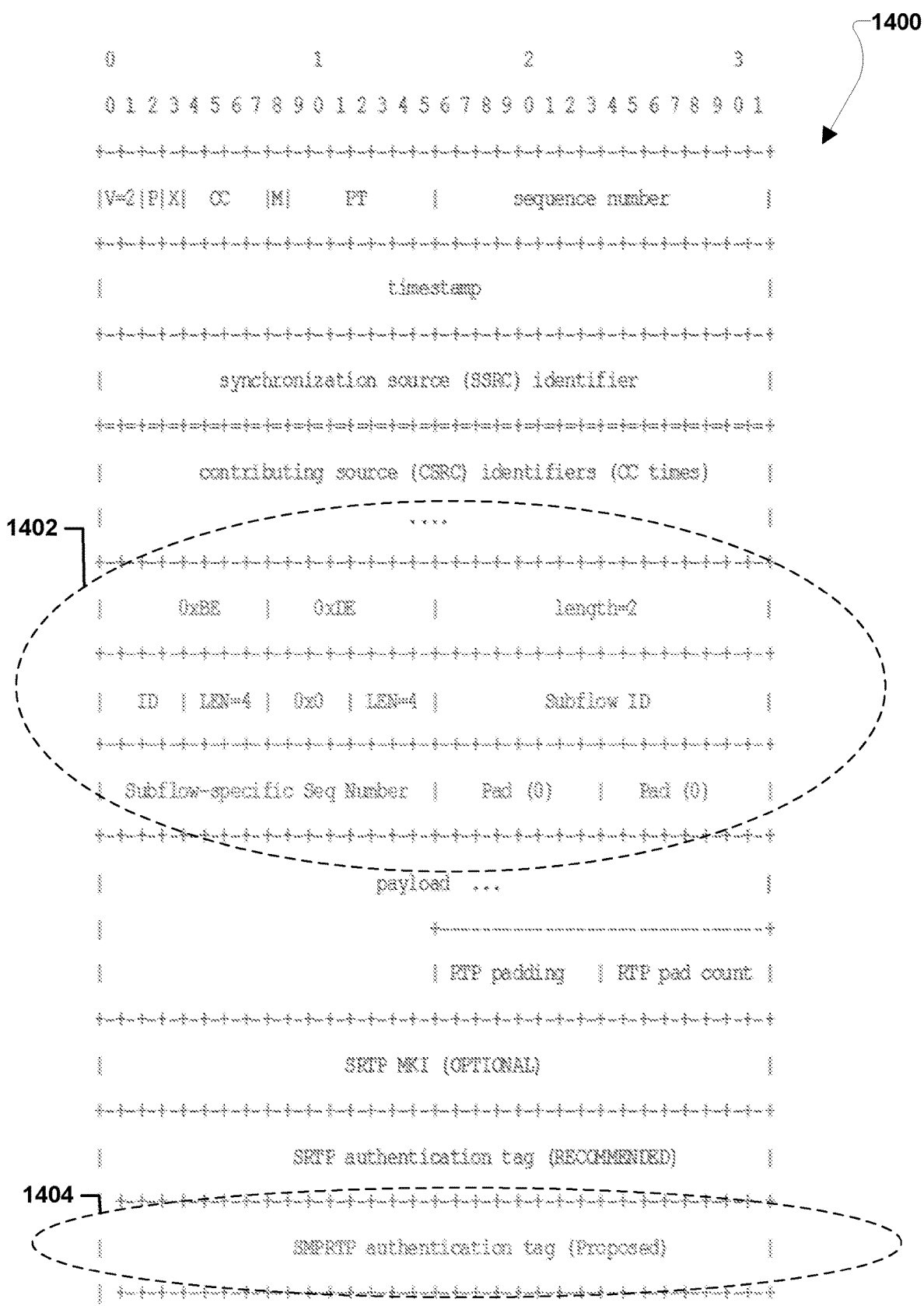
FIG. 14 is an example schema of a Secure MPRTP packet according to an embodiment.

FIG. 14 is an example schema of a Secure MPRTP (SMPRTP) packet 1400 according to an embodiment. The SMPRTP packet 1400 may include an MPRTP extension header 1402 similar to MPRTP header extension 608 described above with reference to FIG. 6B. This may preserve the SRTP encryption added by the RTP source, which may ensure the packet body encryption remains intact. Additionally, a second authentication signature, an SMPRTP tag 1404, may be added to provide an authentication signature that may apply to the entire packet 1400. Thus, both the packet body and header may be encrypted and authenticated by the dual authentication signatures, SRTP MKI and SMPRTP included in the packet 1400. In other embodiments, the subflow RTCP packets may be encrypted and authenticated by the security context of the MPRTP layer as these packets may be generated and processed at the MPRTP layer itself.

Figure 15:
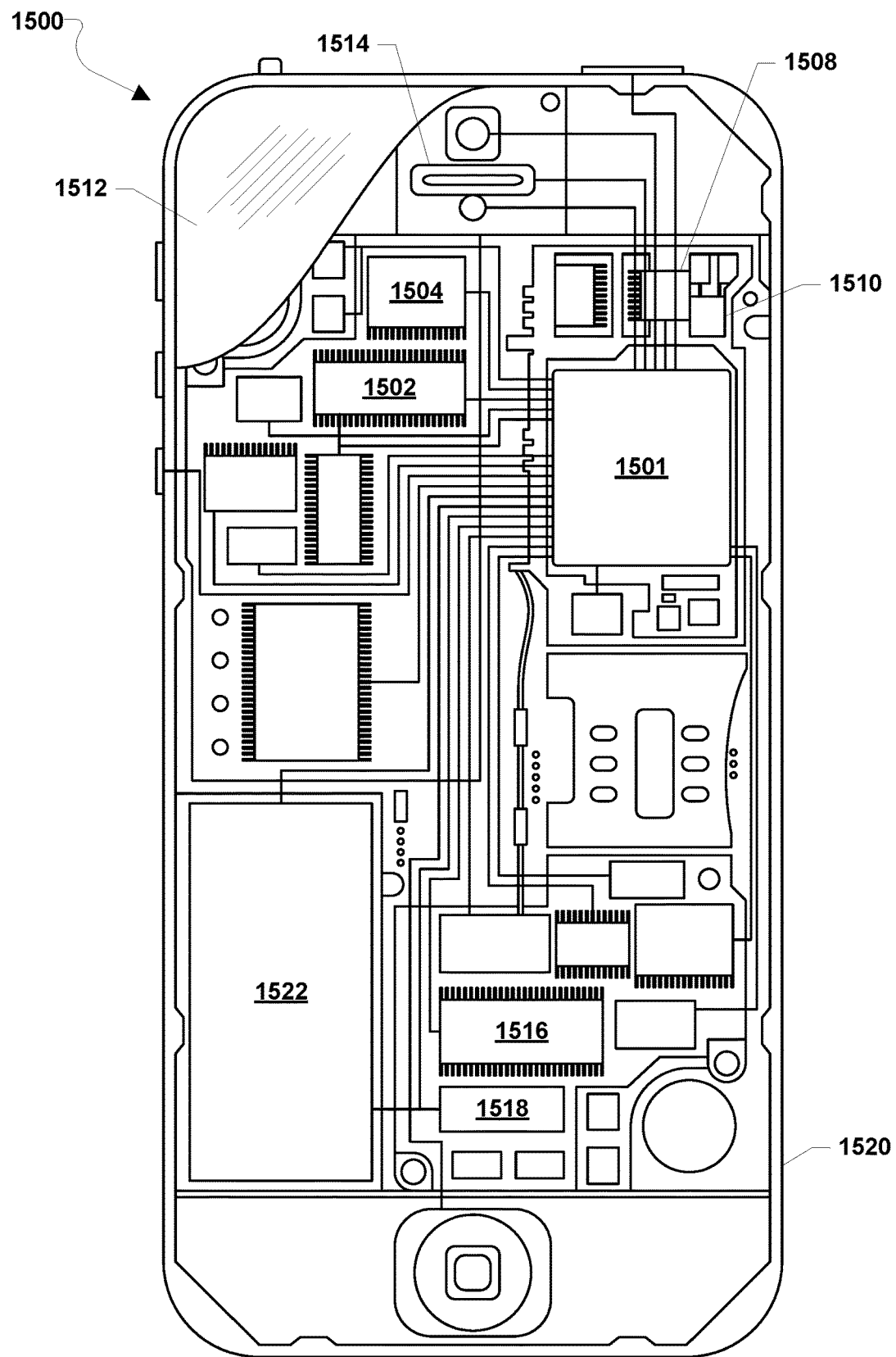
FIG. 15 is a component diagram of an example computing device suitable for use with the various embodiments.

The various embodiments (including, but not limited to, embodiments discussed above with reference to FIGS. 1-14) may be implemented in any of a variety of the computing devices (e.g., mobile devices), an example of which is illustrated in FIG. 15. For example, the mobile device 1500 may include a processor 1501 coupled to a touch screen controller 1504 and an internal memory 1502. The processor 1501 may be one or more multicore integrated circuits (ICs) designated for general or specific processing tasks. The internal memory 1502 may be volatile or non-volatile memory, and may also be secure and/or encrypted memory, or unsecure and/or unencrypted memory, or any combination thereof. The touch screen controller 1504 and the processor 1501 may also be coupled to a touch screen panel 1512, such as a resistive-sensing touch screen, capacitive-sensing touch screen, infrared sensing touch screen, etc. The mobile device 1500 may have one or more radio signal transceivers 1508 (e.g., Peanut®, Bluetooth®, Zigbee®, Wi-Fi, RF, cellular, etc.) and antennae 1510, for sending and receiving, coupled to each other and/or to the processor 1501. The transceivers 1508 and antennae 1510 may be used with the above-mentioned circuitry to implement the various wireless transmission protocol stacks and interfaces. The mobile device 1500 may include one or more cellular network wireless modem chips 1516, such as one cellular network wireless modem chip, two cellular network wireless modem chips, three cellular network wireless modem chips, four cellular network wireless modem chips, or more than four cellular network wireless modem chips, that enables communication via one or more cellular networks and that are coupled to the processor.

The mobile device 1500 may include a peripheral device connection interface 1518 coupled to the processor 1501. The peripheral device connection interface 1518 may be singularly configured to accept one type of connection, or multiply configured to accept various types of physical and communication connections, common or proprietary, such as USB, FireWire, Thunderbolt, Ethernet, or PCIe. The peripheral device connection interface 1518 may also be coupled to a similarly configured peripheral device connection port (not shown). The mobile device 1500 may also include speakers 1514 for providing audio outputs.

The mobile device 1500 may also include a housing 1520, constructed of a plastic, metal, or a combination of materials, for containing all or some of the components discussed herein. The mobile device 1500 may include a power source 1522 coupled to the processor 1501, such as a disposable or rechargeable battery. The rechargeable battery may also be coupled to the peripheral device connection port to receive a charging current from a source external to the mobile device 1500.

Figure 16:
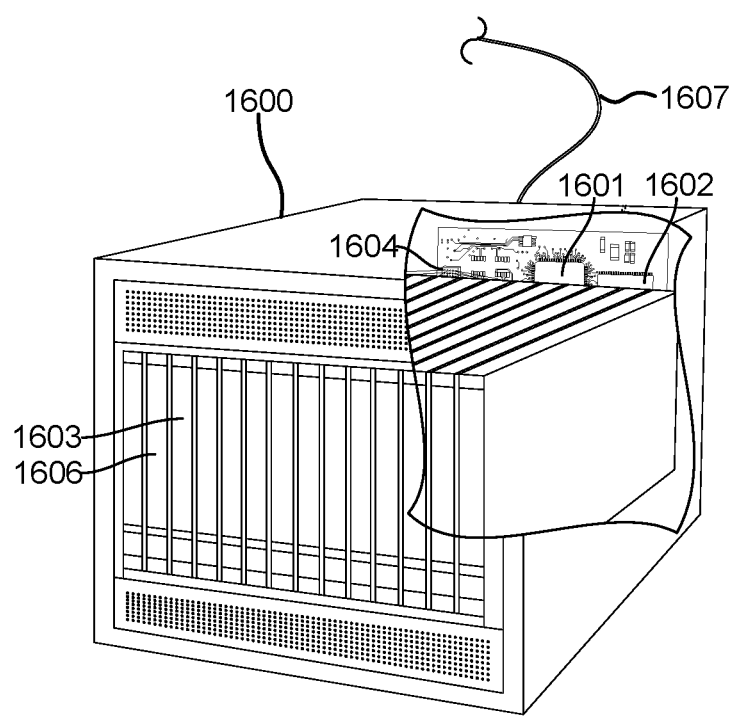
FIG. 16 is a component diagram of an example server suitable for use with the various embodiments.

The various embodiments (including, but not limited to, embodiments discussed above with reference to FIGS. 1-14) may also be implemented on any of a variety of commercially available server devices, such as the server 1600 illustrated in FIG. 16. Such a server 1600 typically includes a processor 1601 coupled to volatile memory 1602 and a large capacity nonvolatile memory, such as a disk drive 1604. The server 1600 may also include a floppy disc drive, compact disc (CD) or DVD disc drive 1606 coupled to the processor 1601. The server 1600 may also include one or more wired or wireless network transceivers 1603, such one or more network access ports and/or wired or wireless modems (e.g., one wireless modem, two wireless modems, three wireless modems, four wireless modems, or more than four wireless modems), coupled to the processor 1601 for establishing network interface connections with one or more communication networks 1607, such as a local area network (e.g., Ethernet, etc.) coupled to other computing devices and/or servers, the Internet, the public switched telephone network, and/or one or more cellular networks (e.g., CDMA, TDMA, GSM, PCS, 3G, 4G, LTE, or any other type of cellular network).

The processors 1501 and 1601 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 1501 and 1601. The processors 1501 and 1601 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 1501 and 1601 including internal memory or removable memory plugged into the device and memory within the processors 1501 and 1601 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for Multipath Real-Time Transport Protocol (MPRTP) transmission of Real-Time Transport Protocol (RTP) packets, comprising:
    receiving an RTP packet at a processor of a computing device, wherein the received RTP packet is part of an RTP stream that is protected using secure RTP (SRTP);
    applying an authentication signature to the RTP packet to authenticate an MPRTP header extension added into a header of the RTP packet, wherein the authentication signature is separate from a SRTP signature of the body of the RTP packet;
    receiving an MPRTP packet at the processor of the computing device, wherein the received MPRTP packet is authenticated using another authentication signature; and
    applying a new authentication signature to a new MPRTP packet to authenticate a MPRTP header extension of the new MPRTP packet.

2. The method of claim 1, wherein the authentication signature is a Secure MPRTP (SMPRTP) tag.

3. The method of claim 2, wherein the computing device is a server and wherein receiving the MPRTP packet further comprises:
    recovering media content included in the received MPRTP packet; and
    generating the new MPRTP packet including the media content for transmission on a new set of paths.

4. A device, comprising:
    a processor configured with processor-executable instructions to perform operations comprising:
        receiving a Real-Time Transport Protocol (RTP) packet, wherein the received RTP packet is part of an RTP stream that is protected using secure RTP (SRTP);
        applying an authentication signature to the RTP packet to authenticate a Multipath Real-Time Transport Protocol (MPRTP) header extension added into a header of the RTP packet, wherein the authentication signature is separate from a SRTP signature of the body of the RTP packet;
        receiving an MPRTP packet, wherein the received MPRTP packet is authenticated using another authentication signature; and
        applying a new authentication signature to a new MPRTP packet to authenticate a MPRTP header extension of the new MPRTP packet.

5. The device of claim 4, wherein the processor is configured with processor-executable instructions to perform operations such that the authentication signature is a Secure MPRTP (SMPRTP) tag.

6. The device of claim 5, wherein:
the device is a server; and
the processor is configured with processor-executable instructions to perform operations such that receiving the MPRTP packet further comprises:
recovering media content included in the received MPRTP packet; and
generating the new MPRTP packet including the media content for transmission on a new set of paths.

7. A device, comprising:
means for receiving a Real-Time Transport Protocol (RTP) packet, wherein the received RTP packet is part of an RTP stream that is protected using secure RTP (SRTP);
means for applying an authentication signature to the RTP packet to authenticate a Multipath Real-Time Transport Protocol (MPRTP) header extension added into a header of the RTP packet, wherein the authentication signature is separate from a SRTP signature of the body of the RTP packet;
means for receiving an MPRTP packet, wherein the received MPRTP packet is authenticated using another authentication signature; and
means for applying a new authentication signature to a new MPRTP packet to authenticate a MPRTP header extension of the new MPRTP packet.

8. The device of claim 7, wherein the authentication signature is a Secure MPRTP (SMPRTP) tag.

9. The device of claim 8, wherein the device is a server and means for receiving the MPRTP packet further comprise:
means for recovering media content included in the received MPRTP packet; and
means for generating the new MPRTP packet including the media content for transmission on a new set of paths.

10. A non-transitory processor-readable storage medium having stored thereon processor-executable instructions configured to cause a processor of a computing device to perform operations comprising:
receiving a Real-Time Transport Protocol (RTP) packet, wherein the received RTP packet is part of an RTP stream that is protected using secure RTP (SRTP);
applying an authentication signature to the RTP packet to authenticate a Multipath Real-Time Transport Protocol (MPRTP) header extension added into a header of the RTP packet, wherein the authentication signature is separate from a SRTP signature of the body of the RTP packet;
receiving an MPRTP packet, wherein the received MPRTP packet is authenticated using another authentication signature; and
applying a new authentication signature to a new MPRTP packet to authenticate a MPRTP header extension of the new MPRTP packet.

11. The non-transitory processor-readable storage medium of claim 10, wherein the stored processor-executable instructions are configured to cause a processor of a computing device to perform operations such that the authentication signature is a Secure MPRTP (SMPRTP) tag.

12. The non-transitory processor-readable storage medium of claim 11, wherein:
the computing device is a server; and
the stored processor-executable instructions are configured to cause a processor of the server to perform operations such that receiving the MPRTP packet further comprises:
recovering media content included in the received MPRTP packet; and
generating the new MPRTP packet including the media content for transmission on a new set of paths.

\* \* \* \* \*